US011163277B2

(12) United States Patent
Kawanoue et al.

(10) Patent No.: US 11,163,277 B2
(45) Date of Patent: Nov. 2, 2021

(54) ABNORMALITY DETECTION SYSTEM, SUPPORT DEVICE, AND MODEL GENERATION METHOD

(71) Applicant: OMRON Corporation, Kyoto (JP)

(72) Inventors: Shinsuke Kawanoue, Kyoto (JP); Kota Miyamoto, Kyoto (JP); Reiko Hattori, Kyoto (JP); Yuki Hirohashi, Kyoto (JP)

(73) Assignee: OMRON Corporation, Kyoto (JP)

( * ) Notice: Subject to any disclaimer, the term of this patent is extended or adjusted under 35 U.S.C. 154(b) by 385 days.

(21) Appl. No.: 16/248,787

(22) Filed: Jan. 16, 2019

(65) Prior Publication Data
US 2019/0286085 A1    Sep. 19, 2019

(30) Foreign Application Priority Data

Mar. 14, 2018    (JP) .............................. JP2018-046673

(51) Int. Cl.
*G05B 17/02* (2006.01)
*G06N 20/00* (2019.01)
(Continued)

(52) U.S. Cl.
CPC ......... *G05B 17/02* (2013.01); *G05B 23/0254* (2013.01); *G06F 11/0751* (2013.01); *G06N 7/005* (2013.01); *G06N 20/00* (2019.01)

(58) Field of Classification Search
CPC ................................ G05B 17/02; G05B 17/00
See application file for complete search history.

(56) References Cited

U.S. PATENT DOCUMENTS 7,080,290 B2 *   7/2006   James ..................... G05B 17/02
                                                      702/179
2005/0288812 A1 * 12/2005  Cheng ............... G05B 19/41875
                                                      700/109
(Continued)

FOREIGN PATENT DOCUMENTS

| CN | 1758034 | 4/2008 |
| CN | 102282516 | 12/2011 |

(Continued)

OTHER PUBLICATIONS

Guo, Hongyu et al. "Learning from Imbalanced Data Sets with Boosting and Data Generation: The DataBoost-IM Approach", ACM SIGKDD Explorations. vol. 6, Issue 1, pp. 30-39, (Year: 2004).*

(Continued)

*Primary Examiner* — Kamini S Shah
*Assistant Examiner* — Russ Guill
(74) *Attorney, Agent, or Firm* — JCIPRNET

(57) ABSTRACT

An abnormality detection system, support device, and model generation method are provided for generating a more highly accurate abnormality detection model before an actual operation. A model generation part of an abnormality detection system includes a section for generating plural feature values from state values provided from a state value storage part, a section for selecting a combination of one or plural feature values among the plural generated feature values, a section for generating an extra learning data set having at least part of a data series of the feature values of the selected combination and a data series of statistically generated virtual feature values, and a section for evaluating a detection accuracy of a model corresponding to the feature values of the selected combination using the extra learning data set.

15 Claims, 17 Drawing Sheets

(51) Int. Cl.
   *G05B 23/02* (2006.01)
   *G06F 11/07* (2006.01)
   *G06N 7/00* (2006.01)

(56) References Cited

U.S. PATENT DOCUMENTS

| | | | |
|---|---|---|---|
| 2007/0265713 A1 | 11/2007 | Veillette et al. | |
| 2012/0041575 A1* | 2/2012 | Maeda ................ | G05B 23/024 700/80 |
| 2017/0103148 A1 | 4/2017 | Natsumeda | |

FOREIGN PATENT DOCUMENTS

| | | |
|---|---|---|
| CN | 102999020 | 3/2013 |
| EP | 3125057 | 2/2017 |
| JP | 2010191556 | 9/2010 |
| SG | 188751 | 4/2013 |

OTHER PUBLICATIONS

Hamed, Tarfa et al. "An Accurate, Fast Embedded Feature Selection for SVMs", 13th International Conference on Machine Learning and Applications, pp. 135-140, (Year: 2014).*

"Search Report of Europe Counterpart Application", dated Jul. 18, 2019, pp. 1-12.

"Office Action of China Counterpart Application", dated Sep. 8, 2021, with English translation thereof, p. 1-p. 16.

* cited by examiner

| | KURTOSIS | LIKELIHOOD OF LOGISTIC REGRESSION | DECISION TREE | INTEGRATION | RANKINGS |
|---|---|---|---|---|---|
| FEATURE VALUE 1 | 0.2584 | 0.6345 | 0.5919 | 0.4949 | 1 |
| FEATURE VALUE 2 | 0.1728 | 0.4483 | 0.4469 | 0.3560 | 2 |
| FEATURE VALUE 3 | 0.3586 | 0.1285 | 0.2688 | 0.2520 | 3 |
| FEATURE VALUE 4 | 0.4164 | 0.0337 | 0.2457 | 0.2319 | 4 |
| FEATURE VALUE 5 | 0.1247 | 0.5982 | 0.4039 | 0.3756 | 5 |
| FEATURE VALUE 6 | 0.2504 | 0.1592 | 0.1974 | 0.2023 | 6 |
| ⋮ | ⋮ | ⋮ | ⋮ | ⋮ | ⋮ |
| 700 | 702 | 704 | 706 | 708 | 710 |

FIG. 16

| FEATURE VALUE 1 | FEATURE VALUE 2 |
|---|---|
| 10 | -20 |
| 10 | 0 |
| 10 | 20 |
| 20 | -20 |
| 20 | 0 |
| 20 | 20 |
| 30 | -20 |
| 30 | 0 |
| 30 | 20 |

FIG. 18

ABNORMALITY DETECTION SYSTEM, SUPPORT DEVICE, AND MODEL GENERATION METHOD

CROSS-REFERENCE TO RELATED APPLICATION

This application claims the priority benefit of Japan application serial no. 2018-046673, filed on Mar. 14, 2018. The entirety of the above-mentioned patent application is hereby incorporated by reference herein and made a part of this specification.

BACKGROUND

Technical Field

The present technology relates to an abnormality detection system for detecting an abnormality that may occur in a monitoring target, a support device that is connected to the abnormality detection system, and a model generation method of the abnormality detection system.

Description of Related Art

There are needs for improving a capacity utilization rate through predictive maintenance for machines and equipment in various kinds of production sites. Predictive maintenance means a manner of maintenance in which any abnormality that has occurred in machines or equipment is detected and then maintenance work such as fixing or replacement is performed before the facility should be stopped.

In order to realize such predictive maintenance, a mechanism that state values of machines or equipment are collected and whether any abnormality has occurred in the machine or equipment is determined based on the collected state values has been proposed.

Patent Document 1 (Japanese Patent Application Laid Open No. 2010-191556), for example, discloses an abnormality detection method and an abnormality detection system that can reduce burdens of users and detect abnormalities with high sensitivity in an earlier stage by using a learning data generation method of sorting out learning data of normal cases for detection of abnormalities of observation data and increasing accuracy.

When an application of predictive maintenance to an actual production site is considered, it is necessary to construct a model to make it possible to detect abnormality of machines or equipment in which no abnormality has ever been detected before the start of a real operation. However, there may be a case that it is not possible to appropriately prepare abnormality/normality information of observation data inputted using the method disclosed in Patent Document 1.

Thus, there is a need for preparing an abnormality detection model with as high accuracy as possible before an actual operation.

SUMMARY

The present technology provides a technology capable of generating an abnormality detection model with higher accuracy before actual operation.

An abnormality detection system according to an example of the disclosure includes a control operation part that executes a control operation for controlling a control target; a first abnormality detection part that detects an abnormality that can occur in a monitoring target by giving a state value related to the monitoring target among state values collected by the control operation part to a model that is defined by an abnormality detection parameter and a learning data set, wherein the model indicates the monitoring target; a state value storage part that stores at least a state value related to the monitoring target among the state values collected by the control computation part; a second abnormality detection part that executes substantially the same detection process as the first abnormality detection part using the state values provided from the state value storage part; and a model generation part that determines the abnormality detection parameter and the learning data set based on a detection result of the second abnormality detection part. The model generation part includes a section for generating a plurality of feature values from the state values provided from the state value storage part; a section for selecting a combination of one or a plurality of feature values among the plurality of generated feature values; a section for generating an extra learning data set including at least a part of a data series of the feature values of the selected combination and a data series of virtual feature values that are generated by a statistical method; and a section for evaluating a detection accuracy of a model corresponding to the feature values of the selected combination using the extra learning data set.

According to another example of the disclosure, a support device that is connected to a control device for controlling a control target is provided. The control device includes a first abnormality detection part that detects an abnormality that can occur in a monitoring target by giving a state value related to the monitoring target among collected state values to a model that is defined by an abnormality detection parameter and a learning data set, wherein the model indicates the monitoring target; and a state value storage part that stores at least a state value related to the monitoring target among the collected state values. The support device includes a second abnormality detection part that executes substantially the same detection process as the first abnormality detection part using the state values provided from the state value storage part; and a model generation part that determines the abnormality detection parameter and the learning data set based on a detection result of the second abnormality detection part. The model generation part includes a section for generating a plurality of feature values from the state values provided from the state value storage part; a section for selecting a combination of one or a plurality of feature values among the plurality of generated feature values; a section for generating an extra learning data set including by at least a part of a data series of the feature values of the selected combination and a data series of virtual feature values that are generated by a statistical method; and a section for evaluating a detection accuracy of a model corresponding to the feature values of the selected combination using the extra learning data set.

According to another example of the disclosure, a model generation method of an abnormality detection system is provided. The abnormality detection system includes a control computation part that executes a control computation for controlling a control target; a first abnormality detection part that detects an abnormality that can occur in a monitoring target by giving a state value related to the monitoring target among state values collected by the control operation part to a model that is defined by an abnormality detection parameter and a learning data set, wherein the model indicates the monitoring target; a state value storage part that stores at least a state value related to the monitoring target among the state values collected by the control computation part; a second abnormality detection part that executes substantially the same detection process as the first abnormality detection part using the state values provided from the state value storage part; and a model generation part that determines the abnormality detection parameter and the learning data set based on a detection result of the second abnormality detection part. The model generation method includes a step of generating a plurality of feature values from the state values provided from the state value storage part; a step of selecting a combination of one or a plurality of feature values among the plurality of generated feature values; a step of generating an extra learning data set including at least a part of a data series of the feature values of the selected combination and a data series of virtual feature values that are generated by a statistical method; and a step of evaluating a detection accuracy of a model corresponding to the feature values of the selected combination using the extra learning data set.

BRIEF DESCRIPTION OF THE DRAWINGS

FIG. 16 is a table for describing a process of evaluating the importance level of a feature value executed by the analysis tool of the support device according to the embodiment.

FIG. 18 is a table showing an example of virtual data generated by the analysis tool of the support device according to the embodiment.

DESCRIPTION OF THE EMBODIMENTS

Figure 1:
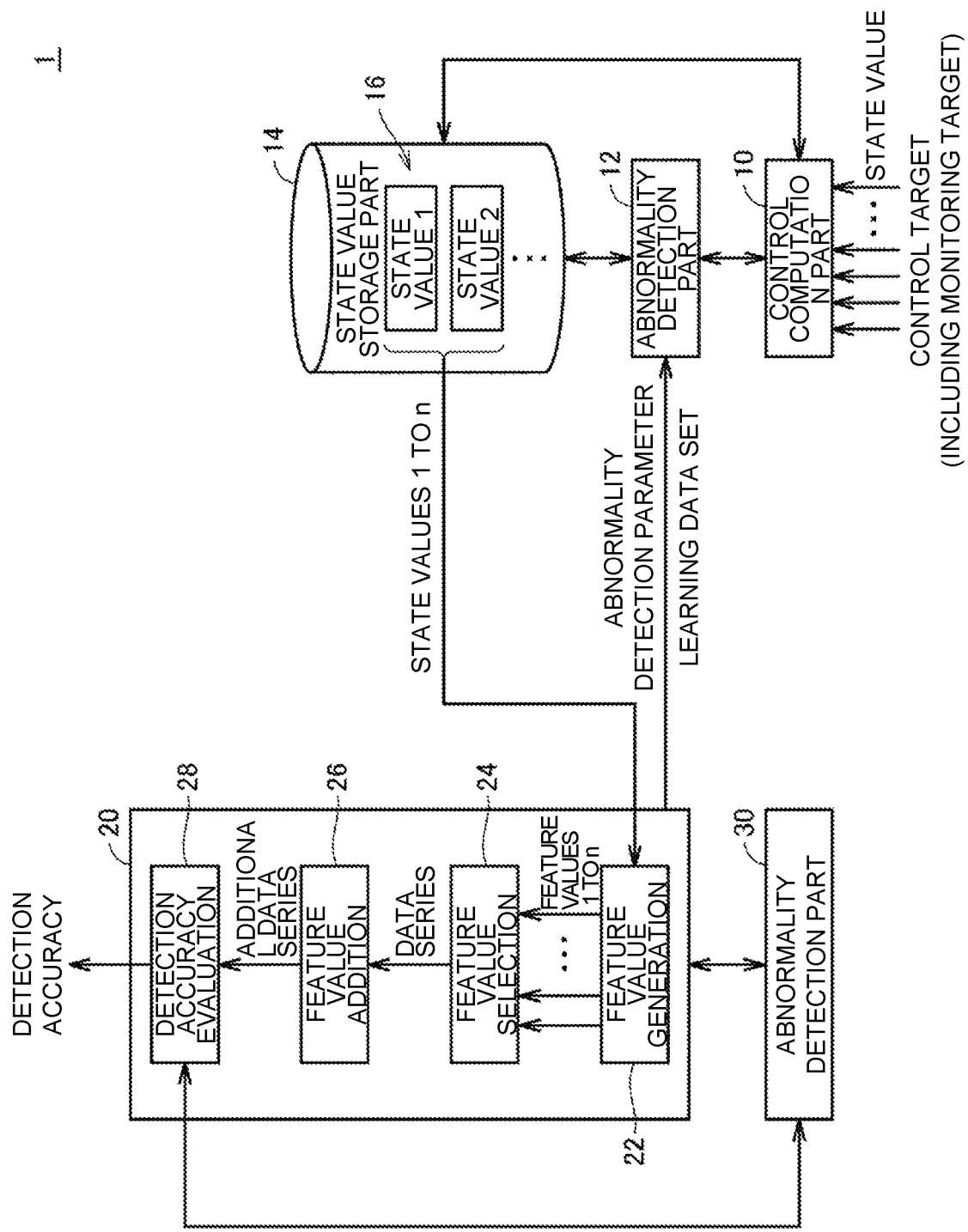
FIG. 1 is a schematic diagram illustrating an example of a functional configuration of an abnormality detection system according to an embodiment.

An embodiment of the disclosure will be described in detail with reference to the attached drawings. Note that the same reference numerals are given to the same or equivalent parts in the drawings, and description thereof will not be repeated.

A. Application Example

First, an example of a scene to which the present invention is applied will be described.

An example of a functional configuration of a control system having an abnormality detection function according to an embodiment will be described. In the following description, the control system will be described mainly focusing on the abnormality detection function of the system, and thus the entire control system will also be referred to as an "abnormality detection system."

FIG. 1 is a schematic diagram illustrating an example of a functional configuration of an abnormality detection system 1 according to an embodiment. Referring to FIG. 1, the abnormality detection system 1 includes a control computation part 10, an abnormality detection part 12, and a state value storage part 14. These constituent elements are basically mounted in a control device such as a programmable logic controller (PLC).

The control computation part 10 executes a control operation for controlling a control target. The abnormality detection part 12 detects an abnormality that may occur in a monitoring target by giving a state value relating to the monitoring target among state values collected by the control operation part 10 to a model defined by an abnormality detection parameter and a learning data set to indicate the monitoring target.

In the present specification, "state value" is a term including a value that can be observed in an arbitrary control target (including a monitoring target) and can include, for example, a physical value that can be measured by an arbitrary sensor, an ON/OFF state of a relay, a switch, or the like, a command value of a position, a speed, a torque or the like given by a PLC to a servo driver, a variable value used by a PCL for an arithmetic operation, and the like.

In the present specification, "abnormality detection parameter" and "learning data set" are for defining a model for detecting an abnormality that may occur in a monitoring target, and will be described in detail below.

The state value storage part 14 stores at least a state value 16 related to the monitoring target among state values collected by the control operation unit 10. The state value storage part 14 basically stores time series data collected at a predetermined sampling period. That is, the state value storage part 14 stores a data series of the state values 16.

The abnormality detection system 1 further includes a model generation part 20 and an abnormality detection part 30. These configurations are basically implemented in a support device connected to a control device.

The abnormality detection part 30 executes substantially the same detection process as the abnormality detection part 20 using the state values 16 provided from the state value storage part 14.

The model generation part 20 determines an abnormality detection parameter and a learning data set based on a detection result of the abnormality detection part 30.

The model generation part 20 includes a feature value generation function 22 of generating a plurality of feature values from the state values 16 provided from the state value storage part 14, a feature value selection function 24 of selecting a combination of one or a plurality of feature values among the plurality of generated feature values, a feature value addition function 26 of generating an extra learning data set constituted by at least part of a data series of the feature values of the selected combination and a data series of statistically generated virtual feature values, and a detection accuracy evaluation function 28 of evaluating detection accuracy of a model corresponding to the feature values of the selected combination using the extra learning data set.

Extra learning data is generated when the feature value addition function 26 adds the data series of the statistically generated virtual feature values to the data series of the feature values generated from the collected state values. A model with high detection accuracy can be configured before an actual operation by evaluating detection accuracy of each combination of feature values in advance using the extra learning data.

B. Example of Overcall Configuration of System

Figure 2:
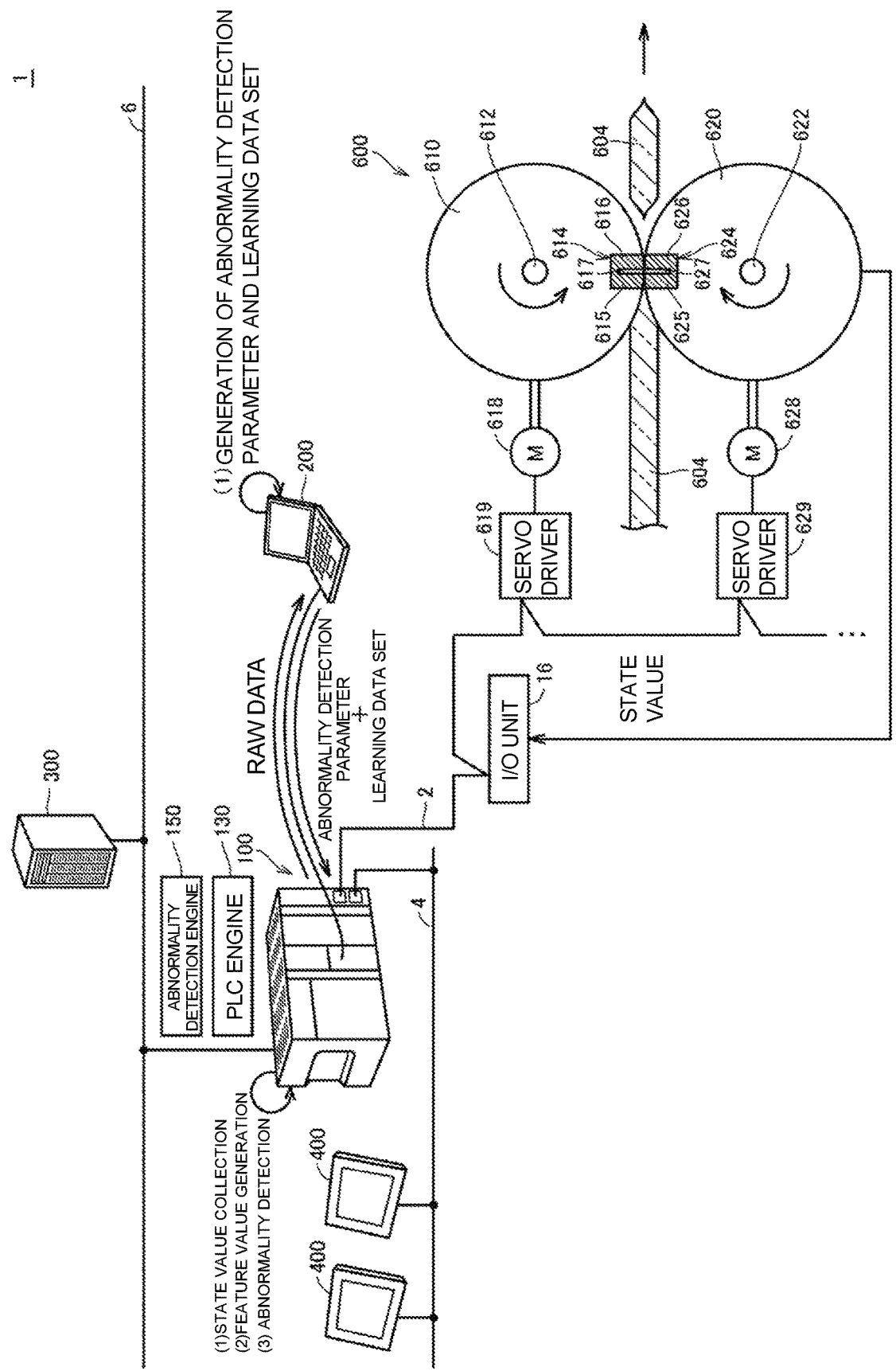
FIG. 2 is a schematic diagram illustrating an example of an overall configuration of the abnormality detection system according to the embodiment.

First, an example of an overall configuration of the abnormality detection system 1 according to the present embodiment will be described. FIG. 2 is a schematic diagram illustrating the example of the overall configuration of the abnormality detection system according to the present embodiment.

Referring to FIG. 2, the abnormality detection system 1 according to the present embodiment includes a control device 100 that controls control targets and a support device 200 that is connected to the control device 100 as main constituent elements. In FIG. 2, an example of a configuration in which the abnormality detection system 1 has a packaging machine 600 as a target of abnormality detection (which will also be referred to as a "monitoring target" below) is illustrated.

The control device 100 may be embodied as a kind of computer such as a PLC. The control device 100 is connected to one or more field devices arranged in the control target via a field network 2 and is connected to one or more operation display devices 400 via another field network 4.

The control device 100 may be further connected to a database server 300 via a higher-level network 6. The control device 100 exchanges data with the connected devices via each of the network. In addition, the database server 300 and the operation display device 400 are optional elements and are not essential elements for the abnormality detection system 1.

An industrial network may be employed for the field network 2 and the field network 4. As such industrial networks, EtherCAT (registered trademark), EtherNet/IP (registered trademark), DeviceNet (registered trademark), CompoNet (registered trademark), and the like are known.

The control device 100 has a processing part (which will also be referred to as an "abnormality detection engine 150" below) that monitors the presence of abnormality in an arbitrary monitoring target in addition to a control computation part (which will also be referred to as a "PLC engine 130" below) that executes control computations for controlling a control target. With the abnormality detection engine 150, the control device 100 executes (1) a process of collecting state values from a monitoring target, (2) a process of generating one or more feature values from the collected state values, and (3) a process of detecting an abnormality based on the generated feature values.

In order to realize the abnormality detection engine 150 with high detection accuracy in the control device 100, it is necessary to appropriately set a feature value, a threshold value, and the like in accordance with characteristics of a monitoring target. In the abnormality detection system 1 according to the present embodiment, a monitoring target is detected to be abnormal when collected state values are determined to indicate characteristics different from those in normal using a statistical method.

In order to realize the abnormality detection engine 150 described above, items to be prepared are: (1) an abnormality detection parameter including a feature value to be used in abnormality detection and a threshold value for determining whether a state is abnormal; and (2) a learning data set including one or more state values and/or feature values that appear when a monitoring target is normal.

Although any device can prepare the abnormality detection parameter and the learning data set, but in the configuration illustrated in FIG. 2, the state values (collected data) collected by the control device 100 are given to the support device 200, and the support device 200 executes an analysis process which will be described below so that the abnormality detection parameter and the learning data set are determined. Then, the support device 200 gives the abnormality detection parameter and the learning data set to the control device 100. That is, the support device 200 sets the determined abnormality detection parameter and learning data set to the abnormality detection engine 150 of the control device 100.

In addition, a configuration in which the control device 100 and the support device 200 are integrated may be employed, and in that case, the abnormality detection process and the determination of the abnormality detection parameter and the learning data set may be executed in a single device.

Figure 3:
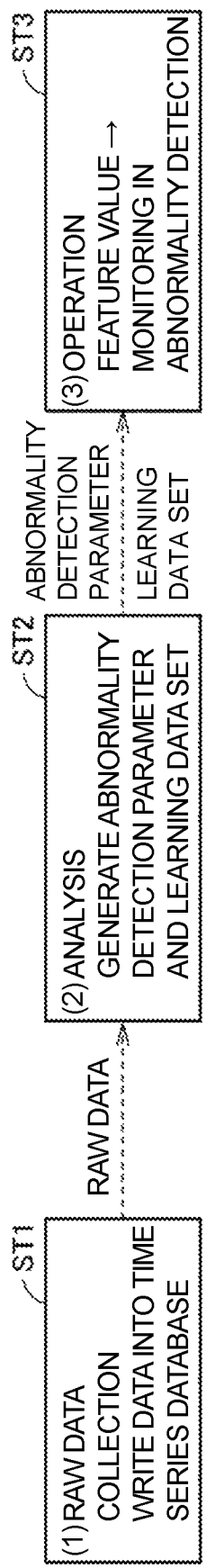
FIG. 3 is a schematic diagram illustrating an overview of the process procedure for operating the abnormality detection system according to the embodiment.

FIG. 3 is a schematic diagram illustrating an overview of the process procedure for operating the abnormality detection system 1 according to the present embodiment. Referring to FIG. 3, first, the control device 100 executes a process of collecting raw data (ST1). In the following description, "raw data" means time series data of state values collected from the monitoring target. Basically, "raw data" includes state values as they are when collected from the monitoring target, and does not include a feature value or the like generated from the state values. Collection of the raw data is realized by sequentially writing the state values in a time series database (which will also be referred to as a "TSDB" below) installed in the control device 100.

The collected raw data is given to the support device 200 and is subject to an analysis process (ST2). In this analysis process, the abnormality detection parameter and the learning data set are generated. In the following description, the process of generating the abnormality detection parameter and the learning data set in accordance with a monitoring target will also be referred to as a "model generation process."

The generated abnormality detection parameter and the learning data set are given to the control device 100. The control device 100 starts an operation of abnormality detection based on the abnormality detection parameter and the learning data set from the support device 200 (ST3). At this time, the control device 100 (the abnormality detection engine 150) generates feature values based on the state values collected from the monitoring target in accordance with the given abnormality detection parameter and executes abnormality detection based on the generated feature values.

As described above, the abnormality detection engine 150 is equivalent to the abnormality detection part that detects an abnormality that can occur in the monitoring target by giving a state value related to the monitoring target among state values collected by the PLC engine 130 to a model that indicates the monitoring target defined by the abnormality detection parameter and the learning data set.

More detailed processes, functions, and the like related to the above-described abnormality detection will be described below.

Referring to FIG. 2 again, the packaging machine 600 that is the monitoring target in the configuration illustrated in FIG. 2 executes a sealing process and/or a cutting process on a package 604 conveyed in a predetermined conveyance direction. The packaging machine 600 has a pair of rotors 610 and 620 that rotate in synchronization with each other. Each of the rotors 610, 620 is disposed such that a tangential direction of the outer circumference thereof at the position in contact with the package 604 coincides with the conveyance direction, and the package 604 is sealed and/or cut by the surfaces of the rotors being in contact with the package 604.

The rotors 610 and 620 of the packaging machine 600 are each rotationally driven by the servo motors 618 and 628 around rotation axes 612 and 622 in synchronization. Processing mechanisms 614 and 624 are each provided on the surfaces of the rotors 610 and 620, and the processing mechanism 614 includes heaters 615 and 616 that are disposed back and forth in the circumferential direction (direction of rotation) and a cutter 617 disposed between the heaters 615 and 616. Likewise, the processing mechanism 624 includes heaters 625 and 626 that are disposed back and forth in the circumferential direction and a cutter 627 disposed between the heaters 625 and 626. The rotors 610 and 620 include the cutters 617 and 627, which are disposed on the outer circumferential surfaces of the rotors to cut the package 604.

By rotating the rotors 610 and 620 in synchronization with a conveyance speed of the package 604, the heater 615 and the heater 625 seal (bond) the opposing surfaces (the upper surface and the lower surface) at the right side of the package 604 in the drawing to each other, and the heater 616 and the heater 626 seal (bond) the opposing surfaces (the upper surface and the lower surface) at the left side of the package 604 in the drawing to each other. In parallel with the above-described sealing process, the cutter 617 and the cutter 627 cut the package 604. By repeating this series of processes, sealing and cutting of the package 604 containing an object to be packaged 605 are repeatedly executed, and thereby individual packages 606 are sequentially generated.

Rotation speeds, torque, and the like of the servo motors 618 and 628 that rotationally drive the rotors 610 and 620 are controlled by servo drivers 619 and 629 that are an example of a driver (drive device). The control device 100 can collect state values of the packaging machine 600 from the servo drivers 619 and 629 and an I/O unit 16. The state values of the packaging machine 600 include (1) rotation positions (phases and rotation angles) of the rotors 610 and 620, (2) speeds of the rotors 610 and 620, (3) accelerations of the rotors 610 and 620, (4) torque values of the servo motors 618 and 628, (5) current values of the servo drivers 619 and 629, (6) voltage values of the servo drivers 619 and 629, and the like.

The control device 100 detects an abnormality of the packaging machine 600 based on state values of the packaging machine 600. When abnormality detection is to be executed, a plurality of state values needs to be collectable from the packaging machine 600 and a state value to be used needs to be determined in advance. In addition, each of the collected state values (time series data) can be directly used, and any feature value may be extracted from time series data of the state values and used.

In the model generation process according to the present embodiment, which state value among one or a plurality of state values collected from the monitoring target is to be used and/or which feature value of the collected state values is to be used is determined as an abnormality detection parameter.

C. Examples of Hardware Configurations

Next, examples of hardware configurations of main devices constituting the abnormality detection system 1 according to the present embodiment will be described.

(c1: Example of Hardware Configuration of Control Device 100)

Figure 4:
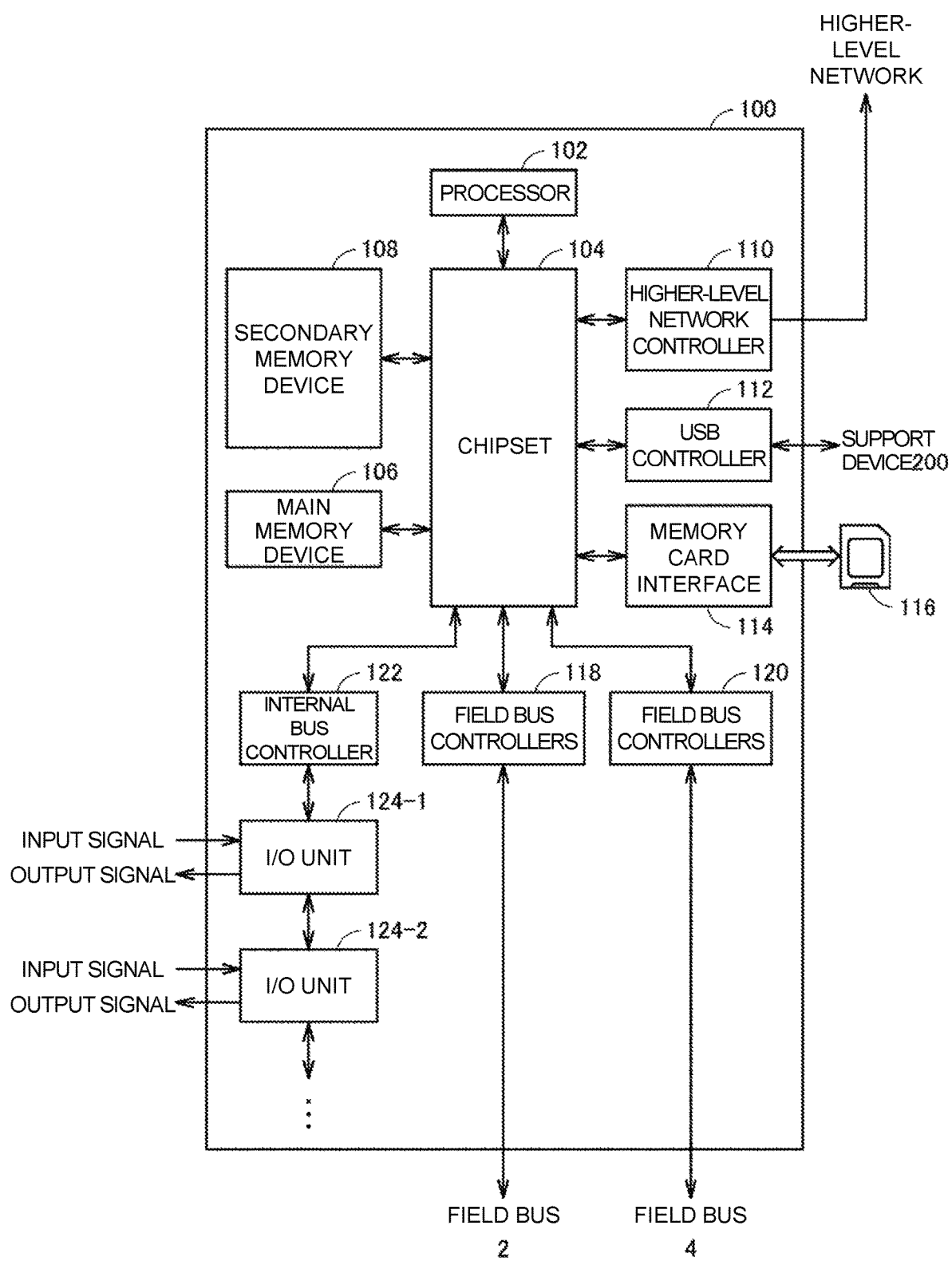
FIG. 4 is a block diagram illustrating an example of a hardware configuration of a control device constituting the abnormality detection system according to the embodiment.

FIG. 4 is a block diagram illustrating an example of a hardware configuration of the control device 100 constituting the abnormality detection system 1 according to the present embodiment. Referring to FIG. 4, the control device 100 includes a processor 102 such as a central processing unit (CPU) or a micro-processing unit (MPU), a chipset 104, a main memory device 106, a secondary memory device 108, a higher-level network controller 110, a Universal Serial Bus (USB) controller 112, a memory card interface 114, an internal bus controller 122, a field bus controllers 118 and 120, I/O units 124-1, 124-2, and the like.

The processor 102 reads various programs stored in the secondary memory device 108 and expands and executes the programs at the main memory device 106, and thereby realizes the PLC engine 130 and the abnormality detection engine 150. The chipset 104 controls data transmission between the processor 102 and each of components, and the like.

The secondary memory device 108 stores a user program to be executed by the PLC engine 130, in addition to a system program for realizing the PLC engine 130. Furthermore, the secondary memory device 108 also stores a program for realizing the abnormality detection engine 150.

The higher-level network controller 110 controls data exchange with another device via the higher-level network 6. The USB controller 112 controls data exchange with the support device 200 via USB connection.

The memory card interface 114 allows a memory card 116 to be detachable therefrom, and makes it possible to write data into the memory card 116 and to read various kinds of data (a user program, trace data, and the like) from the memory card 116.

The internal bus controller 122 is an interface on which data is exchanged with the I/O units 124-1, 124-2, and the like mounted in the control device 100.

The field bus controller 118 controls data exchange with another device via the field network 2. Likewise, the field bus controller 120 controls data exchange with another device via the field network 4.

Although an example of a configuration in which functions necessary for the processor 102 to execute programs are provided is illustrated in FIG. 4, some or all of the provided functions may be implemented using a dedicated hardware circuit (e.g., an application specific integrated circuit (ASIC), a field-programmable gate array (FPGA), etc.). Alternatively, the main parts of the control device 100 may be realized using hardware based on general architecture (e.g., an industrial personal computer based on a general personal computer). In this case, a plurality of operating systems (OS) for different applications may be executed in parallel and necessary applications may be executed in each OS using a virtualization technology.

(c2: Example of Hardware Configuration of Support Device 200)

The support device 200 according to the present embodiment is realized by executing a program using hardware based on general architecture (e.g., a general personal computer) as an example.

Figure 5:
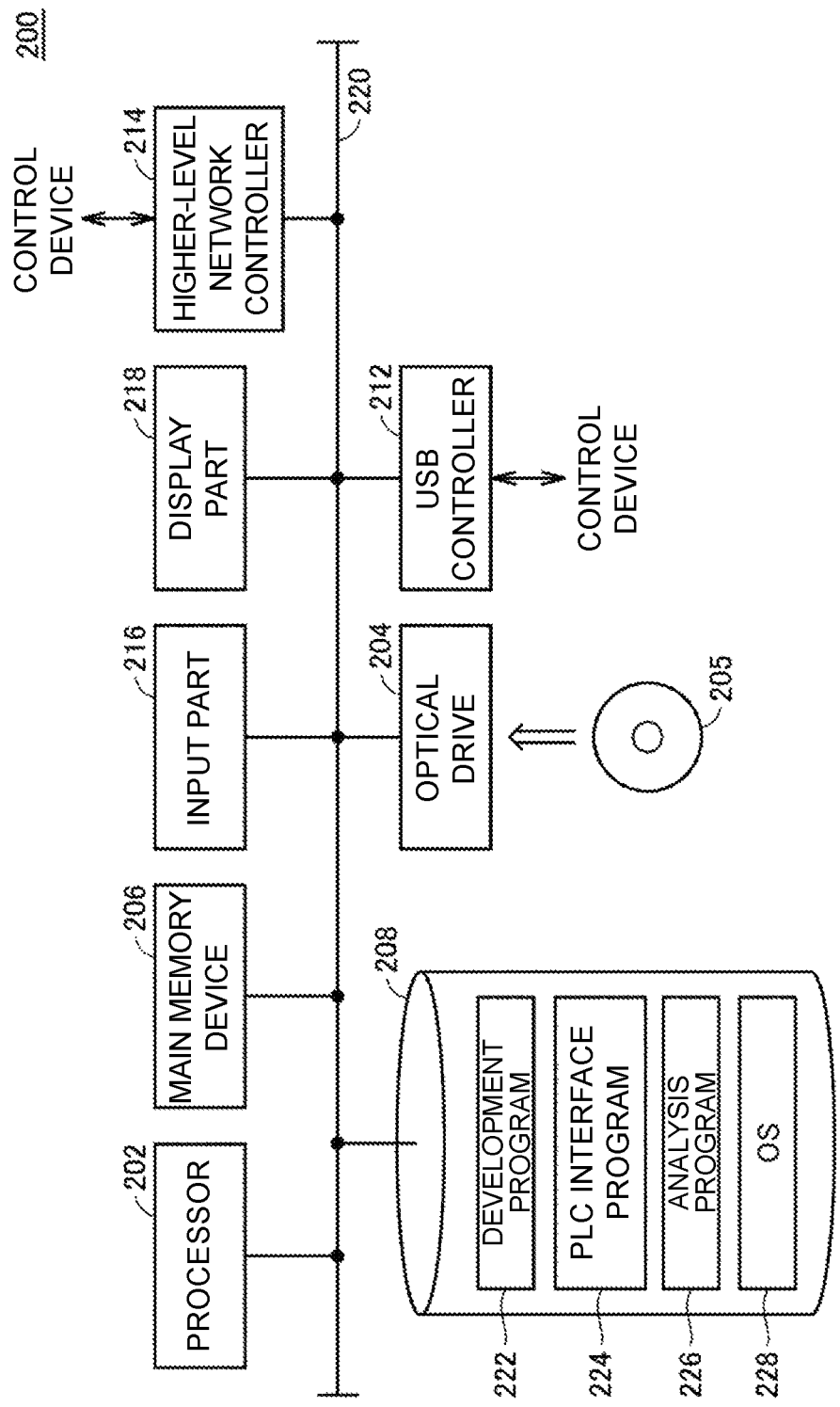
FIG. 5 is a block diagram illustrating an example of a hardware configuration of a support device constituting the abnormality detection system according to the embodiment.

FIG. 5 is a block diagram illustrating an example of a hardware configuration of the support device 200 constituting the abnormality detection system 1 according to the present embodiment. Referring to FIG. 5, the support device 200 includes a processor 202 such as a CPU or an MPU, an optical drive 204, a main memory device 206, a secondary memory device 208, a USB controller 212, a higher-level network controller 214, an input part 216, and a display part 218. These components are connected to each other via a bus 220.

The processor 202 reads various programs stored in the secondary memory device 208, expands and executes the programs at the main memory device 206, and thereby realizes various processes including the model generation process which will be described below.

The secondary memory device 208 includes, for example, a hard disk drive (HDD), a flash solid state drive, (SSD), or the like. The secondary memory device 208 typically stores a development program 222 for creating a user program to be executed in the support device 200, debugging the created user program, defining a system configuration, setting various parameters, and the like, a PLC interface program 224 for exchanging data regarding the abnormality detection function with the control device 100, an analysis program 226 for realizing the model generation process according to the present embodiment, and an OS 228. The secondary memory device 208 may store necessary programs other than the programs illustrated in FIG. 5.

The support device 200 has the optical drive 204, and reads a program stored in a recording medium 205 that stores computer readable programs in a non-transitory manner (e.g., an optical recording medium such as a digital versatile disc (DVD)) therefrom and installs the program in the secondary memory device 208 or the like.

Although various programs to be executed by the support device 200 may be installed via the computer readable recording medium, the programs may be installed in the way of downloading them from a server device or the like on a network. In addition, the functions provided by the support device 200 according to the present embodiment may be realized in the form of using some modules provided by the OS.

The USB controller 212 controls data exchange with the control device 100 via USB connection. The higher-level network controller 214 controls data exchange with another device via an arbitrary network.

The input part 216 includes a keyboard, a mouse, and the like, and receives a user operation. The display part 218 includes a display, various indicators, a printer, and the like, and outputs a process result from the processor 202, and the like.

Although an example of a configuration in which functions necessary for the processor 202 to execute programs are provided is illustrated in FIG. 5, some or all of the provided functions may be implemented using a dedicated hardware circuit (e.g., an ASIC, a FPGA, etc.).

D. Example of Software Configuration and Example of Functional Configuration

Figure 6:
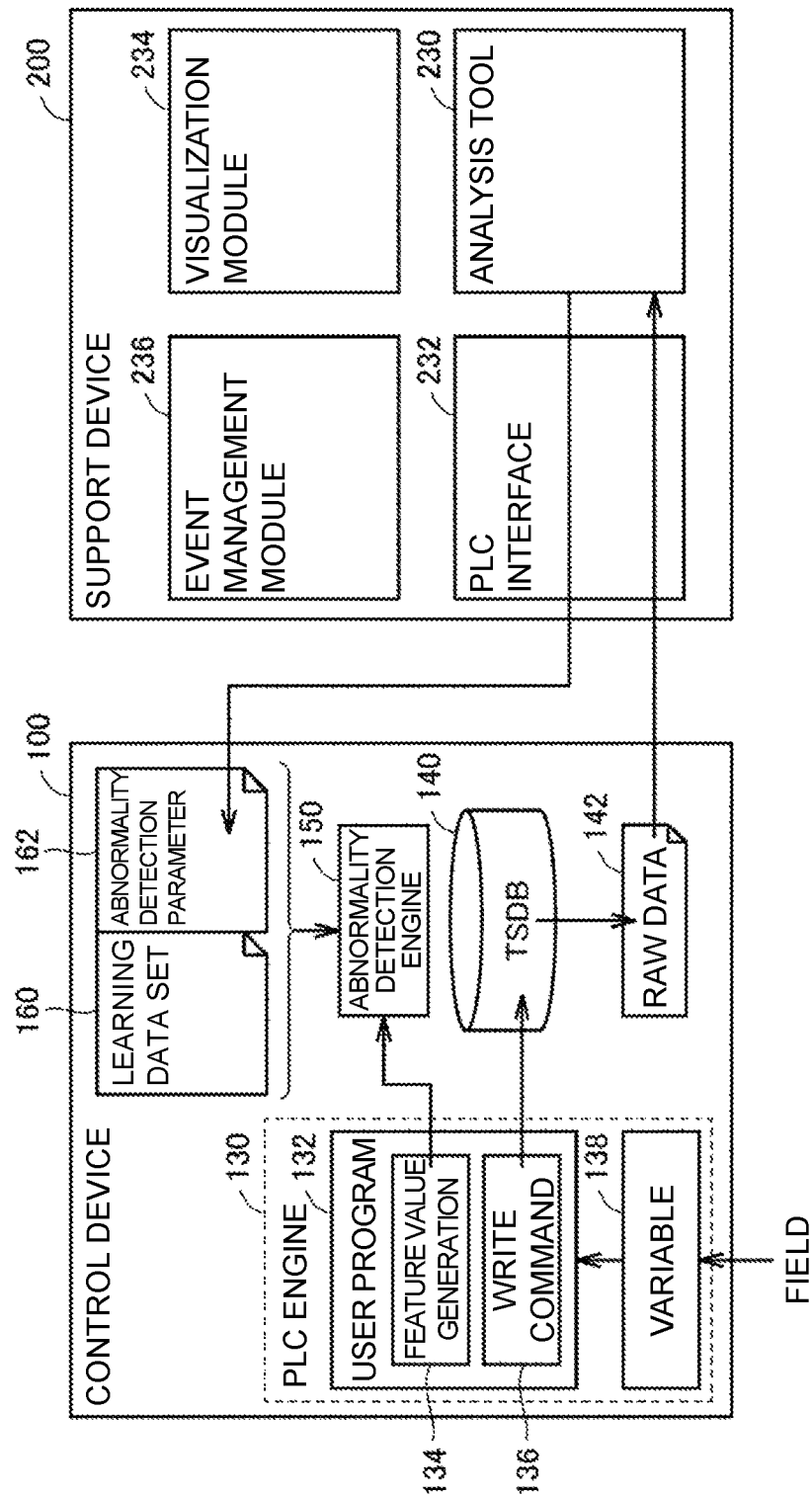
FIG. 6 is a block diagram illustrating an example of a software configuration of the abnormality detection system according to the embodiment.

Next, an example of a software configuration and an example of a functional configuration of the main devices constituting the abnormality detection system 1 according to the present embodiment will be described. FIG. 6 is a block diagram illustrating an example of a software configuration of the abnormality detection system 1 according to the present embodiment.

Referring to FIG. 6, the control device 100 includes the PLC engine 130, a time series database (TSDB) 140, and the abnormality detection engine 150 as main functional configurations.

The PLC engine 130 successively interprets a user program 132 and executes a designated control operation. The PLC engine 130 manages state values collected from a field in the form of variable 138 and the variable 138 is updated at predetermined periods. The PLC engine 130 may be realized when the processor 102 of the control device 100 executes a system program.

In realization of the abnormality detection system 1 according to the present embodiment, the user program 132 includes a feature value generation command 134 and a write command 136.

The feature value generation command 134 includes a command to generate a feature value (e.g., an average, a maximum value, a minimum value, or the like in a predetermined period of time) of a predetermined state value in accordance with a predetermined process. The generated feature value is used in an abnormality detection process by the abnormality detection engine 150.

The write command 136 includes a command to write collected state values (variable 138) into the time series database 140.

The state values sequentially written into the time series database 140 are outputted as raw data 142. As will be described below, part of the raw data 142 stored in the time series database 140 is also used in the model generation process of the support device 200. As described above, the time series database 140 corresponds to the state value storage part that stores at least a state value related to the monitoring target among the state values collected by the PLC engine 130.

The abnormality detection engine 150 monitors the presence of an abnormality in the monitoring target in accordance with an abnormality detection parameter 162 using a pre-given learning data set 160 as a model indicating the monitoring target. When the abnormality detection engine 150 determines that any abnormality has occurred in the monitoring target, the abnormality detection engine reports the occurrence of the abnormality to the PLC engine 130 or updates the predetermined variable 138 with a value indicating the abnormality.

Meanwhile, the support device 200 includes an analysis tool 230, a PLC interface 232, a visualization module 234, and an event management module 236 as main functional configurations.

The analysis tool 230 analyzes the raw data 142 including the state values collected by the control device 100 and determines the learning data set 160 and the abnormality detection parameter 162. The analysis tool 230 is typically realized when the processor 202 of the support device 200 executes the analysis program 226.

The PLC interface 232 is in charge of a process of acquiring the raw data 142 from the control device 100, a process of transmitting the determined learning data set 160 and abnormality detection parameter 162 to the control device 100, and the like. The PLC interface 232 is typically realized by the processor 202 of the support device 200 executing the analysis program 226.

The visualization module 234 visualizes information provided by the analysis tool 230 as a screen user interface and receives an operation from a user.

The event management module 236 causes each module to execute various processes in accordance with an event that occurs inside or outside the support device 200.

The visualization module 234 and the event management module 236 are typically provided as functions included in an OS.

Figure 7:
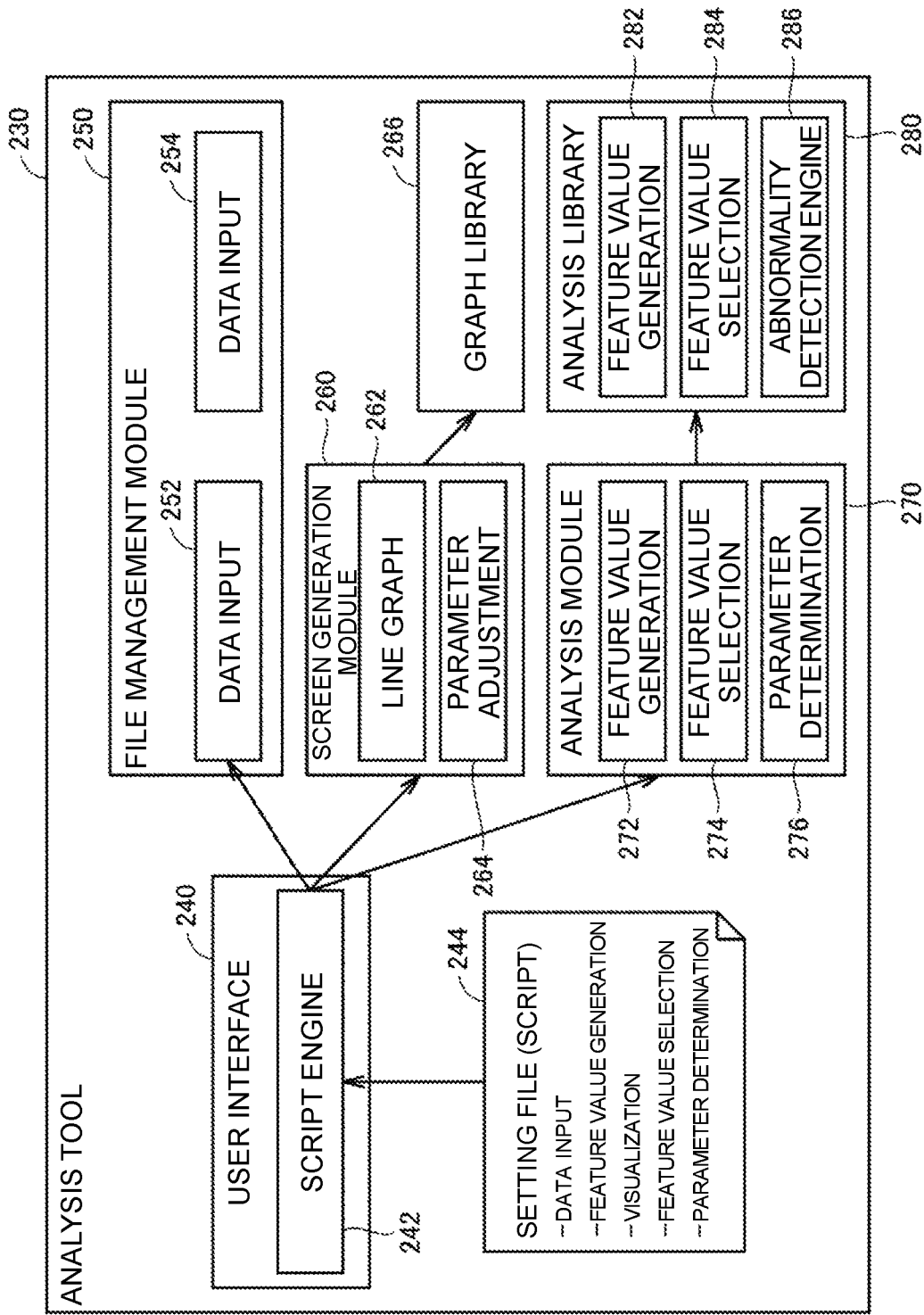
FIG. 7 is a block diagram illustrating an overview of function modules included in the analysis tool illustrated in FIG. 6.

FIG. 7 is a block diagram illustrating an overview of function modules included in the analysis tool 230 illustrated in FIG. 6. Referring to FIG. 7, the analysis tool 230 of the support device 200 includes a user interface 240, a file management module 250, a screen generation module 260, an analysis module 270, and an analysis library 280 as main functional configurations.

The user interface 240 receives a setting from a user and executes integrated processes for providing various kinds of information to the user. As a specific implementation form, the user interface 240 has a script engine 242, and thus reads a setting file 244 including a script in which a necessary process is described and executes the set process.

The file management module 250 includes a data input function 252 that reads data from a designated file or the like and a data generation function 254 that generates a file including generated data or the like.

The screen generation module 260 includes a line graph generation function 262 that generates a polygonal line graph based on input data or the like and a parameter adjustment function 264 that receives a user operation and changes various parameters. The line graph generation function 262 also updates a polygonal line in accordance with a change in the parameters. The line graph generation function 262 and the parameter adjustment function 264 execute necessary processes with reference to a graph library 266.

The analysis module 270 is a module that realizes main processes of the analysis tool 230, and has a feature value generation function 272, a feature value selection function 274, and a parameter determination function 276.

The feature value generation function 272 generates a feature value from time series data of arbitrary state values included in the raw data 142. The feature value selection function 274 executes a process of selecting a feature value to be used in the abnormality detection process and a process of receiving the selection of the feature value. The parameter determination function 276 executes a process of determining a parameter necessary for the abnormality detection process.

The analysis library 280 includes libraries for each of the functions included in the analysis module 270 to execute processes. More specifically, the analysis library 280 includes a feature value generation library 282 to be used by the feature value generation function 272, a feature value selection library 284 to be used by the feature value selection function 274, and an abnormality detection engine 286 to be used by the parameter determination function 276.

The process executed by the feature value generation function 272 included in the analysis module 270 is substantially the same as the process executed in accordance with the feature value generation command 134 (see FIG. 6) described in the user program 132 of the control device 100. In addition, the abnormality detection engine 286 included in the analysis library 280 is substantially the same as the process executed by the abnormality detection engine 150 (see FIG. 6) of the control device 100.

The abnormality detection engine 286 of the support device 200 corresponds to an abnormality detection part, which executes substantially the same detection process as that of the abnormality detection engine 150 of the control device 100 using state values (the raw data 142) provided from the time series database 140 of the control device 100.

In the abnormality detection system 1 according to the present embodiment, an environment in which both the control device 100 and the support device 200 can realize the same abnormality detection process is provided. In such environment, the abnormality detection process of the control device 100 can be reproduced in the support device 200, and as a result, the abnormality detection process that should be executed by the control device 100 can be determined by the support device 200 in advance.

More specifically, the analysis module 270 of the support device 200 corresponds to the model generation part and determines the abnormality detection parameter 162 and the learning data set 160 based on a detection result made by the abnormality detection engine 286 included in the analysis library 280.

E. Overview of Abnormality Detection Process

Next, an overview of the abnormality detection process employed by the abnormality detection system 1 according to the present embodiment will be described.

In the present embodiment, when data of the monitoring target is estimated to be an outlier with respect to a data set obtained by statistical methods, it is detected as an abnormal value.

Figure 8:
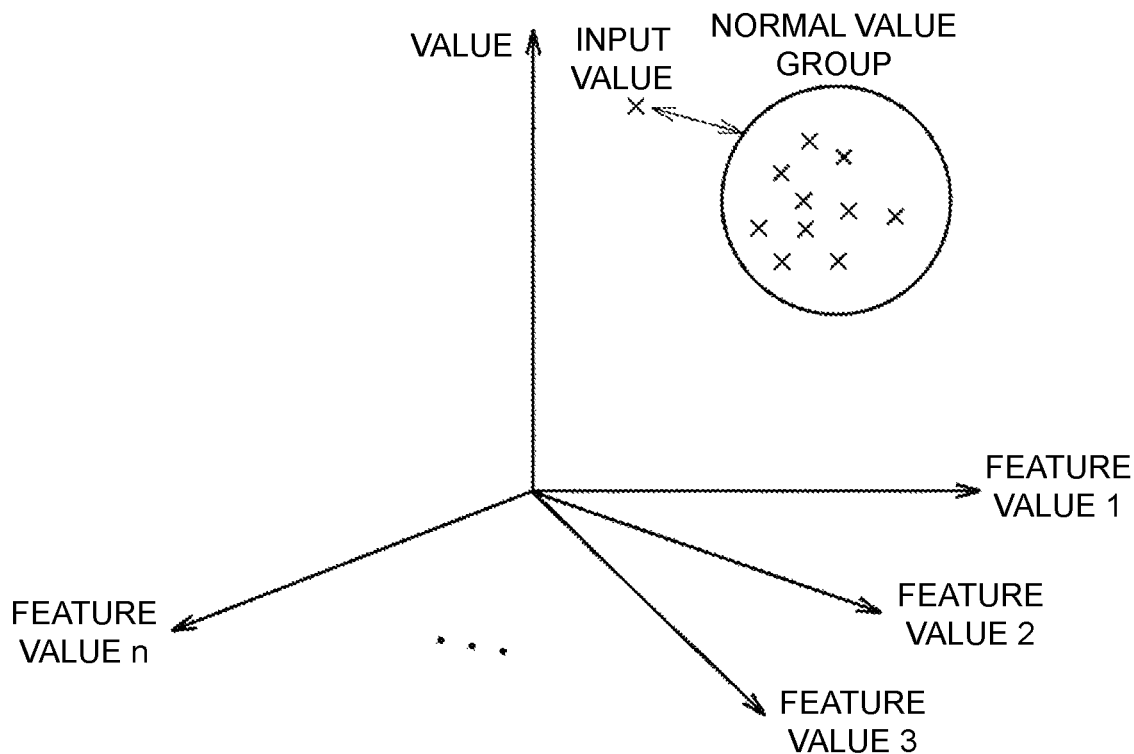
FIG. 8 is a schematic diagram for describing the basic concept of an abnormality detection process of the abnormality detection system according to the embodiment.

FIG. 8 is a schematic diagram for describing the basic concept of the abnormality detection process of the abnormality detection system 1 according to the present embodiment. Referring to FIG. 8, first, feature values 1, 2, 3, . . . , and n are generated from one or more state values collected from the monitoring target (the monitoring target is assumed to have been labeled "normal") and positions corresponding to the state values in a hyperspace in which the generated feature values respectively set as dimensions are sequentially plotted. A coordinate value group corresponding to the state values of the monitoring target labeled "normal" is defined as a normal value group in advance.

Then, the corresponding feature values 1, 2, 3, . . . , and n are generated from one or more of the state values collected from the monitoring target at an arbitrary sampling timing, and coordinates respectively corresponding to the generated feature values (which corresponds to an "input value" of FIG. 8) are set.

Finally, the presence of an abnormality in the monitoring target at a sampling timing corresponding to the input value is determined based on a deviation degree of the input value from the normal value group in the hyperspace. The normal value group of FIG. 8 corresponds to a "model" indicating the monitoring target.

As such a method for abnormality detection based on the deviation degree, a method of detecting an abnormality based on a shortest distance from each point to a normal value group (a K-nearest neighbor method), a local outlier factor (LoF) method of evaluating a distance including a cluster including a normal value group, isolation forest (iForest) that uses an abnormality score calculated from a path length, and the like are known.

Figure 9:
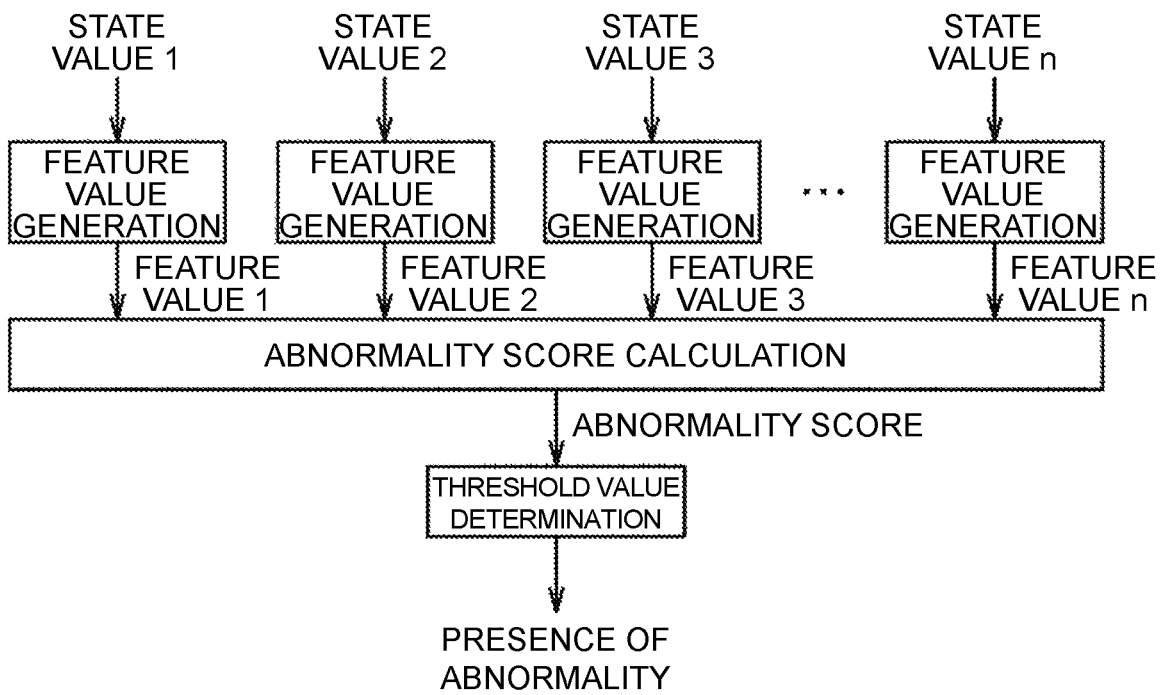
FIG. 9 is a schematic diagram outlining the process procedure of the abnormality detection process of the abnormality detection system according to the embodiment.

FIG. 9 is a schematic diagram outlining the process procedure of the abnormality detection process of the abnormality detection system 1 according to the present embodiment. In FIG. 9, it is assumed that a set of state values has been collected from the monitoring target at an arbitrary sampling timing. The presence of an abnormality in the monitoring target at the sampling timing is determined.

First, among a plurality of state values that are collectable from the monitoring target, feature values 1, 2, 3, . . . , and n are generated using predetermined state values 1, 2, 3, . . . , and n.

In addition, there is also a way that a plurality of feature values may be generated from the same state value. Although the configuration in which at least four feature values are used is shown for the sake of convenience in description, there may be at least one feature value in the abnormality detection process according to the present embodiment.

Next, an abnormality score is calculated from the one or more feature values. The abnormality score is a value indicating a possibility that one or a set of plural feature values of an evaluation target is an outlier or an abnormal value. The larger the value, the higher the probability of an abnormal value becomes (however, an abnormality score may be set to indicate a lower value when a value is more likely to be an abnormal value).

Finally, the calculated abnormality score is compared to a predetermined threshold value, and thereby whether an abnormality has occurred in the monitoring target is determined.

The model generation process according to the present embodiment includes a process of selecting a feature value to be used in the calculation of an abnormality score and a process of determining a threshold value of the abnormality score calculated from the selection.

F. Outlined Procedure of Model Generation Process

Next, an outlined procedure of the model generation process according to the present embodiment will be described.

Figure 10:
FIG. 10 is a schematic diagram illustrating details of the analysis process (ST2) included in the process procedure illustrated in FIG. 3.
Figure 11:
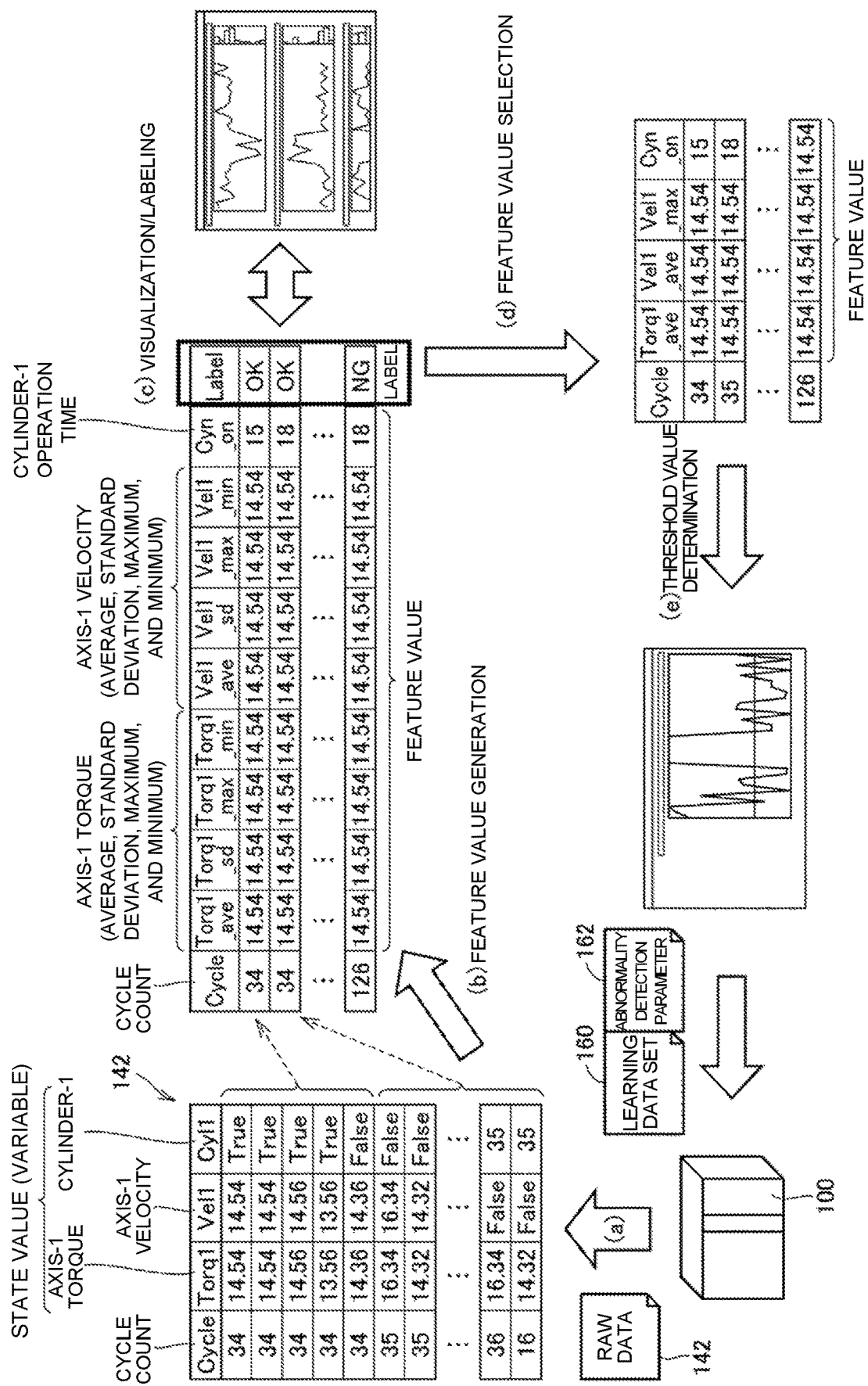
FIG. 11 is a schematic diagram visually illustrating an overview of the processes (a) to (e) illustrated in FIG. 10.

FIG. 10 is a schematic diagram illustrating details of the analysis process (ST2) included in the process procedure illustrated in FIG. 3. FIG. 11 is a schematic diagram visually illustrating an overview of the processes (a) to (e) illustrated in FIG. 10.

Referring to FIG. 10, the analysis process (ST2) corresponding to the model generation process according to the present embodiment mainly includes five processes, which are: (a) a data input process, (b) a feature value generation process, (c) a visualization/labeling process, (d) a feature value selection process, and (e) a threshold value determination process.

Referring to FIG. 11, the raw data 142 that is time series data of state values collected by the control device 100 is given to the support device 200 ((a) a data input process).

The raw data 142 includes one or more state values at each sampling timing. In the example illustrated in FIG. 11, the raw data 142 includes a cycle count indicating the number of processes in the packaging machine 600, and includes an axis-1 torque, an axis-1 velocity, and a cylinder-1 ON/OFF state as examples of state values.

The support device 200 generates one or more feature values using the input raw data 142 ((b) a feature value generation process). In the example illustrated in FIG. 11, feature values related to the axis-1 torque include average, standard deviation, maximum, and minimum of the axis-1 torque, and feature values related to the axis-1 velocity include average, standard deviation, maximum, and minimum value. In addition, the generated feature values include an operation time of the cylinder-1.

Then, the support device 200 executes visualization of the feature values and labeling of a set of feature values of each sampling timing ((c) a visualization/labeling process). The visualization of the feature values is basically executed by the support device 200, and the entire or part of the labeling may be executed by a user.

As a more specific example, a user sets whether a state of the monitoring target is "normal" or "abnormal" at each sampling timing with reference to the feature values visualized in the form of a graph or the like. Note that it is thought that a real monitoring target is unlikely to come into an abnormal state, and thus in most cases, it is labeled "normal."

Next, one or more feature values to be used in abnormality detection are selected among the plurality of feature values generated from the collected state values ((d) a feature value selection process). In the example illustrated in FIG. 11, the four items including the average of the axis-1 torque, the average of the axis-1 velocity, the maximum of the axis-1 velocity, and the operation time of the cylinder-1 have been selected.

An abnormality score is calculated based on the selected one or more feature values as described above and a threshold value for determining an abnormality is determined with reference to the calculated abnormality score ((e) a threshold value determination process).

The learning data set 160 and the abnormality detection parameter 162 are generated through the above-described procedure. The generated learning data set 160 and abnormality detection parameter 162 are given from the support device 200 to the control device 100, and the control device 100 executes the abnormality detection process in accordance with a setting of the support device 200.

The processes (a) to (e) illustrated in FIG. 11 can be appropriately repeated, and the model indicating the monitoring target can also be sequentially updated.

G. Example of Procedure of Setting Operation by User in Model Generation Process Next, an example of the procedure of a setting operation by a user in the model generation process according to the present embodiment will be described.

Figure 12:
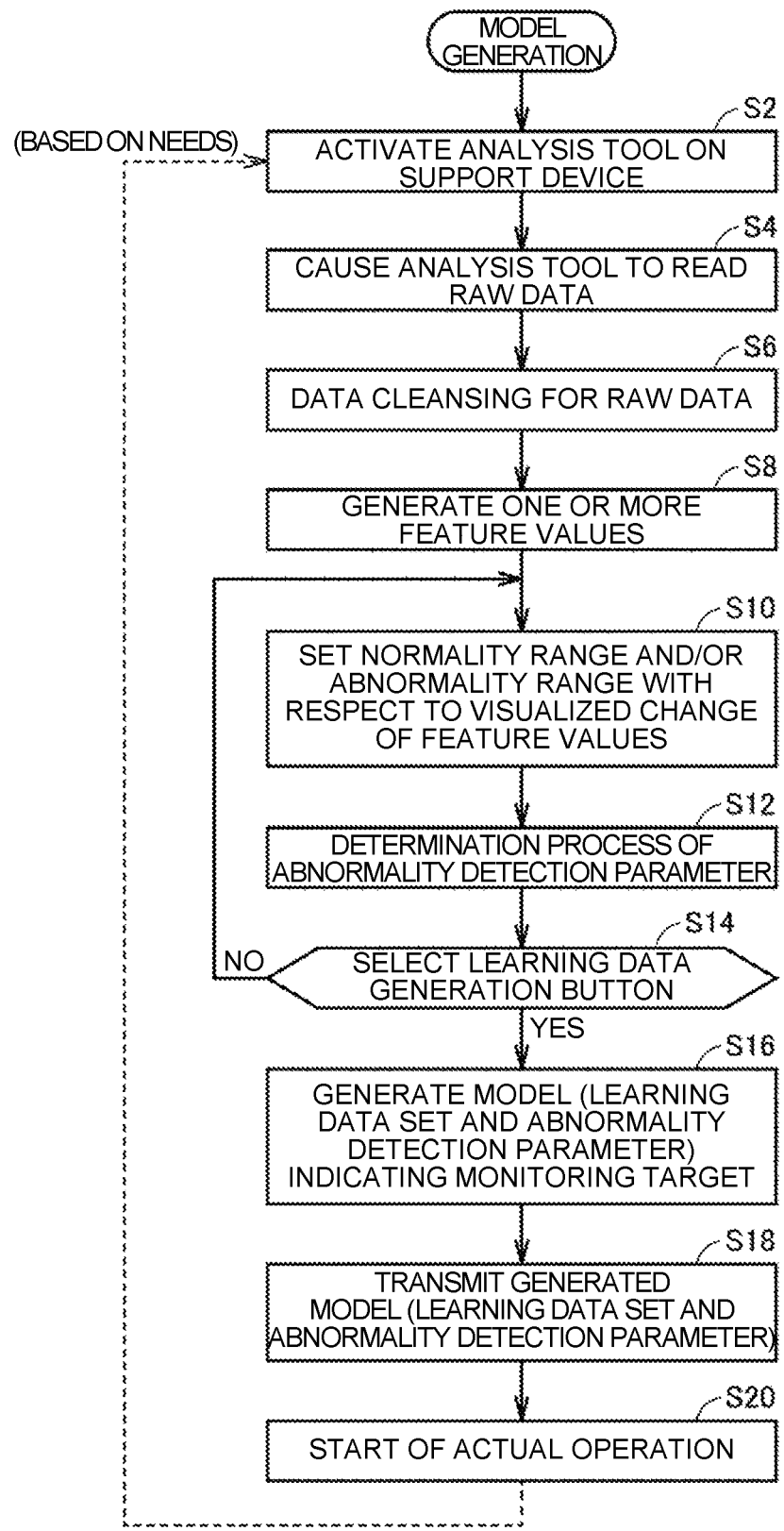
FIG. 12 is a flowchart showing an example of the procedure of a setting operation by a user in a model generation process according to the embodiment.

FIG. 12 is a flowchart showing an example of the procedure of the setting operation by a user in the model generation process according to the present embodiment. Referring to FIG. 12, first, a user activates the analysis tool 230 on the support device 200 (Step S2), and causes the analysis tool 230 being executed on the support device 200 to read the raw data 142 (Step S4).

Then, the user executes data cleansing for the read raw data 142 (Step S6). Data cleansing is a process of deleting data included in the raw data 142 that is unnecessary for the generation of a model. For example, a state value having zero variance (i.e., a state value showing no change) is deleted from the time series data included in the raw data 142. The data cleansing process may be automatically executed by the analysis tool 230, or the analysis tool 230 may present candidates for state values to be deleted and the user may explicitly select a target to be deleted.

Furthermore, the user may manually delete a state value that has been determined to be unnecessary or corrupt data with reference to visualized state values or the like. That is, the support device 200 may receive selection of a state value to be excluded from the generation of a feature value among state values (the raw data 142) provided from the time series database 140 of the control device 100.

Then, the analysis tool 230 generates one or more feature values based on the state values included in the raw data 142 that have undergone data cleansing (Step S8). More specifically, the feature value generation function 272 of the analysis tool 230 generates a plurality of feature values from the state values (the raw data 142) provided from the time series database 140 of the control device 100. In Step S8, it is possible to set as many kinds of feature values to be generated as possible (which corresponds to (b) a feature value generation process of FIG. 11).

Then, the analysis tool 230 visualizes a change of the feature values in accordance with a selection operation of the user, and the user sets a normality range and/or an abnormality range with respect to the visualized change of the feature values (Step S10) (which corresponds to (c) a visualization/labeling process of FIG. 11).

Figure 13:
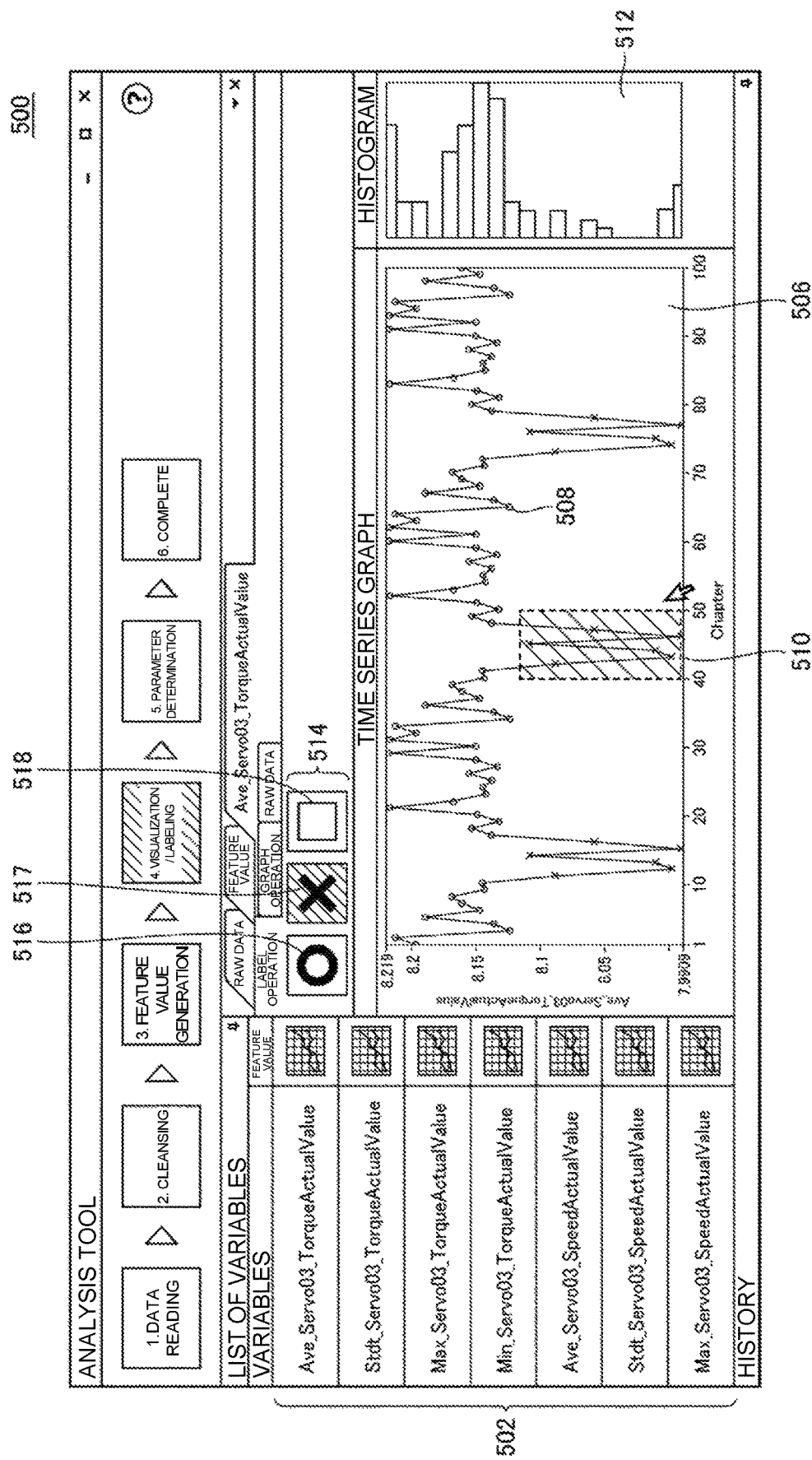
FIG. 13 is a schematic diagram illustrating an example of a user interface screen provided to a user in Step S10 of FIG. 12.

FIG. 13 is a schematic diagram illustrating an example of a user interface screen 500 provided to the user in Step S10 of FIG. 12. Referring to FIG. 13, the user interface screen 500 visualizes the change of the feature values generated in Step S8. Typically, a temporal change of the feature values is made into a graph on the user interface screen 500, and the user evaluates predominance of each feature value with reference to this graph. Furthermore, the user sets an abnormality range and a normality range for the change of the feature values displayed on the user interface screen 500. Note that the abnormality range and the normality range set by the user may be set based on information indicating whether the monitoring target is actually abnormal or is normally operating, or a change of a feature value that the user wants to set as abnormal may be arbitrary set. That is, the abnormality range and the normality range set on the user interface screen 500 define an "abnormal" or a "normal" state that is the output of the abnormality detection process according to the present embodiment, and do not necessarily match whether the monitoring target is actually abnormal or normal.

More specifically, the user interface screen 500 includes a selection reception area 502 with respect to the feature values, a graph display area 506, and a histogram display area 512.

In the selection reception area 502, a list indicating the details of the feature values generated in advance is displayed, and a user selects an arbitrary feature value on the list displayed in the selection reception area 502.

In the graph display area 506, a graph 508 showing changes of the feature values selected by the user in the selection reception area 502 is displayed. The graph 508 may be segmented by time series data of each sampling, a unit of processing (e.g., a unit of processing work) of the monitoring target, or the like.

In the histogram display area 512, a histogram showing the distribution of the changes of the feature values selected by the user in the selection reception area 502 is displayed. It is possible to ascertain the main range of the selected feature values or the like when the histogram displayed in the histogram display area 512 is checked.

The user can set a normality range and/or abnormality range of the data for the changes of the feature value (the graph 508) displayed in the graph display area 506. More specifically, the user interface screen 500 includes a labeling tool 514. The labeling tool 514 includes a normality label setting button 516, an abnormality label setting button 517, and a label setting range specification button 518.

The user selects the normality label setting button 516 or the abnormality label setting button 517 in accordance with whether the label to be given is normality or abnormality, then selects the label setting range specification button 518, and then performs an operation of specifying an area that will be subject to the graph display area 506 (e.g., a drag operation). Accordingly, the set label is given to the specified area.

In FIG. 13, an example in which an abnormality range 510 has been set is illustrated. Feature values of the sampling timings included in the abnormality range 510 are labeled "abnormal," and other feature values are labeled "normal." As described above, the analysis tool 230 may have the function of giving at least one label of "normal" and "abnormal" to a specific range of a data series of a plurality of generated feature values in accordance with a user operation.

Note that a normality range and/or an abnormality range of data can be likewise set with respect to a histogram displayed in the histogram display area 512.

Referring to FIG. 12 again, next, the analysis tool 230 executes a determination process of an abnormality detection parameter in accordance with a user operation (Step S12). The process of Step S12 corresponds to (d) a feature value selection process and (e) a threshold value determination process shown in FIG. 11.

In Step S12, default parameters (a feature value to be used and a threshold value) have been set in advance by the feature value selection function 274 (see FIG. 7) of the analysis tool 230. The user adjusts necessary parameters while checking a displayed detection rate or the like.

Figure 14:
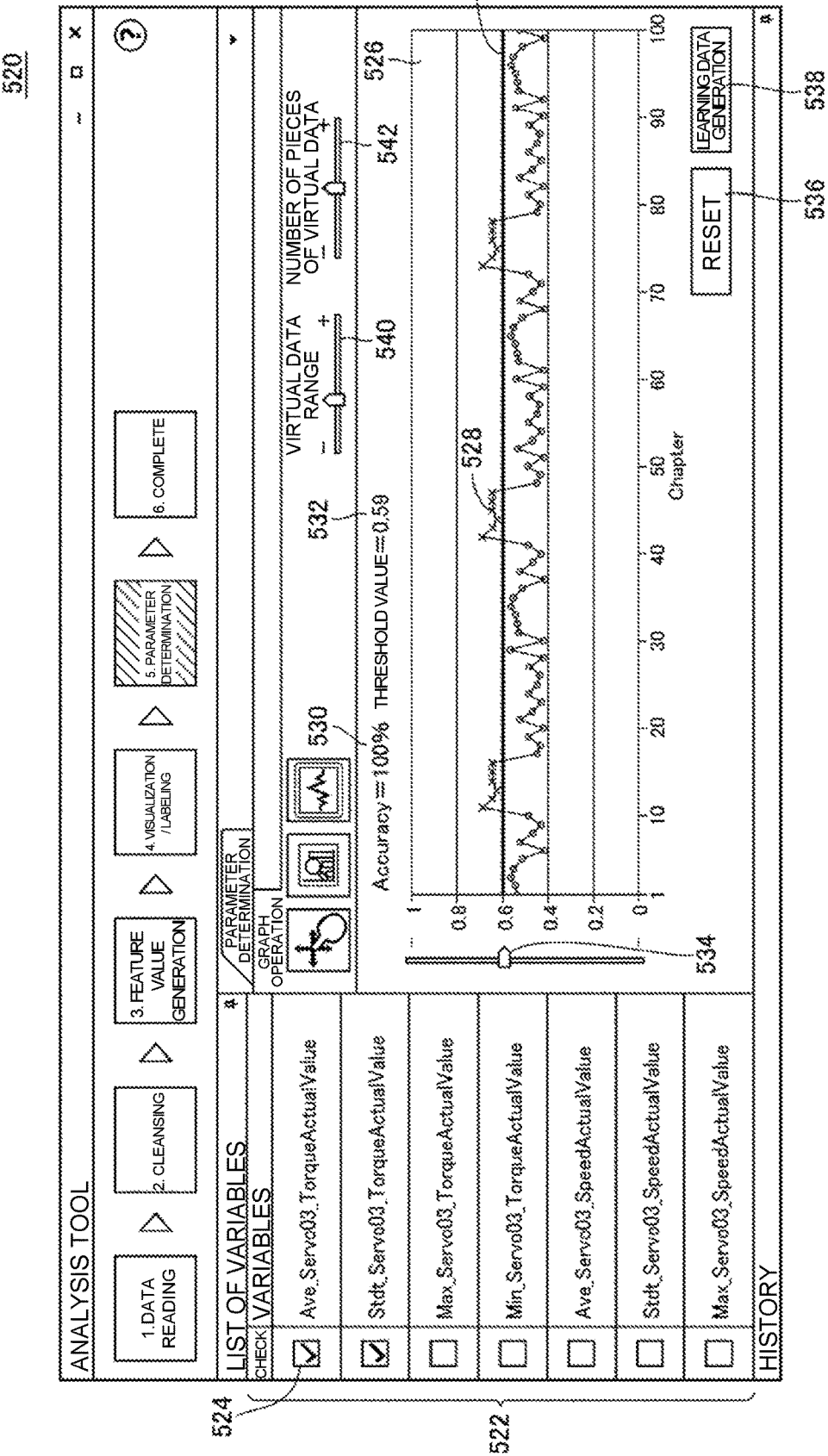
FIG. 14 is a schematic diagram illustrating an example of a user interface screen provided to a user in Step S12 of FIG. 12.

FIG. 14 is a schematic diagram illustrating an example of a user interface screen 520 provided to the user in Step S12 of FIG. 12. Referring to FIG. 14, the user interface screen 520 mainly receives selection of one or more feature values to be used in the abnormality detection process and receives selection of a threshold value to be used in the abnormality detection process.

More specifically, the user interface screen 520 includes a selection reception area 522 with respect to feature values, and a graph display area 526.

The selection reception area 522 of the user interface screen 520 corresponds to a user interface that receives selection of one or more feature values to be used in determination of an abnormality detection parameter and a learning data set among the plurality of generated feature values. More specifically, in the selection reception area 522, a list indicating details of the feature values generated in advance is displayed, and a user determines an arbitrary feature value to be used in calculation of an abnormality score by checking a checkbox 524 associated with the feature value on the displayed list.

Feature values displayed in the selection reception area 522 may be listed such that values that are presumed to have higher importance levels are at higher positions based on a result analyzed by the feature value selection function 274 (see FIG. 7) of the analysis tool 230 in advance. That is, in the selection reception area 522, the display order of the plurality of generated feature values may be determined in accordance with their rankings determined in the procedure which will be described below.

In addition, in an early stage, feature values selected in advance by the feature value selection function 274 (see FIG. 7) of the analysis tool 230 may be selected as default values in the selection reception area 522. That is, in the selection reception area 522, a predetermined number of feature values may be displayed in accordance with the determined rankings in a state in which the feature values are selected among the plurality of generated feature values. FIG. 14 illustrates a state in which two feature values to be used in the calculation of an abnormality score have been selected.

In the graph display area 526, a graph 528 showing changes of the abnormality score calculated based on the one or more feature values selected by checking the checkbox 524 of the selection reception area 522 is displayed. As described above, a data series of the abnormality score calculated based on the data series of the selected one or more feature values is displayed in the graph display area 526.

The threshold value setting slider 534 is arranged in association with the graph display area 526. A set threshold value is updated in conjunction with a user operation on the threshold value setting slider 534, and the position of a threshold value display bar 535 displayed in the graph display area 526 is changed. As described above, the threshold value setting slider 534 receives a setting of the threshold value of the abnormality score displayed in the graph display area 526.

With respect to an initial threshold value, a threshold value calculated in advance by the feature value selection function 274 and the parameter determination function 276 (see FIG. 7) of the analysis tool 230 may be set as an initial value (a default value).

In the graph display area 526, a numeric display 530 indicating a detection rate and another numeric display 532 indicating a set threshold value are arranged. A value of the numeric display 532 is also updated in conjunction with a user operation on the threshold value setting slider 534.

A detection rate indicated by numeric display 530 indicates a value indicating to what degree accurate detection is possible based on the currently selected one or more feature values and the currently set threshold value. More specifically, a detection rate indicates to what degree a feature value included in a normality range set by the user (i.e., a feature value labeled "normal") can be accurately distinguished from a feature value included in an abnormality range set by the user (i.e., a feature value labeled "abnormal") according to the current setting.

The user appropriately executes selection of a feature value to be used in abnormality detection and/or a setting of a threshold value thereof while checking the shape of the graph 528 displayed in the graph display area 526 and the value of a detection rate indicated by the numeric display 530.

The user interface screen 520 includes a slider 540 for adjusting a distribution range of virtual data to be added to a learning data set as will be described below and a slider 542 for adjusting the number of pieces of virtual data. The user can adjust virtual data to be added to a learning data set while checking the shape of the graph 528 displayed in the graph display area 526 and the value of the detection rate indicated by the numeric display 530, in addition to the selection and setting of the feature value and the threshold value.

When a reset button 536 on the user interface screen 520 is selected, a reset is made in a state in which the feature value selected in advance by the feature value selection function 274 of the analysis tool 230 is selected (default state).

When a learning data generation button 583 of the user interface screen 520 is selected, a learning data set 160 and an abnormality detection parameter 162 are generated in accordance with the content set at the time point.

Referring to FIG. 12 again, when the user selects the learning data generation button 583 of the user interface screen 520 by appropriately operating the user interface screen 500 illustrated in FIG. 13 and the user interface screen 520 illustrated in FIG. 14 (YES in Step S14), the analysis tool 230 generates a model (the learning data set 160 and the abnormality detection parameter 162) indicating the monitoring target (Step S16). That is, the analysis tool 230 generates a model of the monitoring target based on parameters adjusted by the user.

Then, the support device 200 transmits the model generated in Step S16 (the learning data set 160 and the abnormality detection parameter 162) to the control device 100 (Step S18), and then an actual operation is started (Step S20).

Note that, in a case where a detection rate and the like in the actual operation are periodically checked and the detection rate is bad after the start of the actual operation (a case where the monitoring target is relatively frequently detected to be abnormal even though it is in a normal state and/or a case where the monitoring target is relatively frequently in an abnormal state even though it is detected to be normal), a model may be generated again using the state values collected by the control device 100.

H. Functions and Processes of Analysis Tool 230

Next, functions and processes provided by the analysis tool 230 included in the support device 200 according to the present embodiment will be described. The functions and the processes which will be described below are executed in the stage before the user interface screens illustrated in FIGS. 13 and 14 are displayed. That is, the user interface screens illustrated in FIGS. 13 and 14 are provided using process results of the analysis tool 230.

Figure 15:
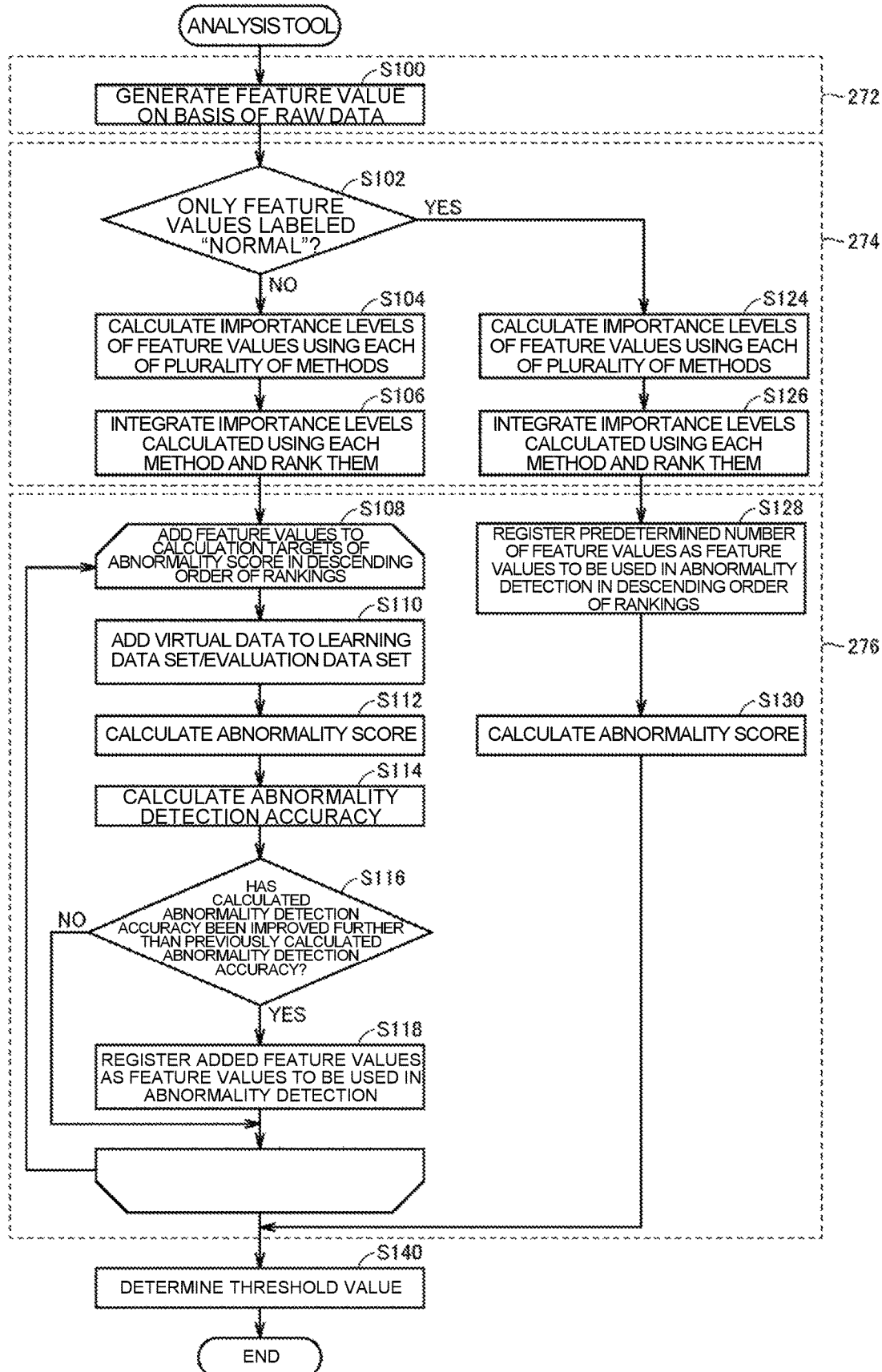
FIG. 15 is a flowchart showing the procedure of processes executed by the analysis tool of the support device according to the embodiment.

FIG. 15 is a flowchart showing the procedure of the processes executed by the analysis tool 230 of the support device 200 according to the present embodiment. The processes included in the flowchart of FIG. 15 are executed through the feature value generation function 272, the feature value selection function 274, and the parameter determination function 276 (see FIG. 7) of the analysis tool 230. FIG. 15 shows steps for which the functions are responsible.

Referring to FIG. 15, the support device 200 generates feature values based on the input raw data 142 (Step S100). The generation of feature values is realized by using the feature value generation function 272 of the analysis tool 230. Generally, a plurality of types of feature values are generated.

Then, the support device 200 executes the processes of Steps S102 to S106, S124, and S126. These processes are realized by using the feature value selection function 274 of the analysis tool 230. The processes of Steps S102 to S106, S124, and S126 of FIG. 15 correspond to a function of estimating a variable importance level by the feature value selection function 274.

Specifically, the support device 200 determines whether only feature values labeled "normal" have been generated (Step S102).

When only feature values labeled "normal" have been generated (YES in Step S102), the processes of Steps S124 and S126 are executed. On the other hand, when the generated feature values include those labeled "normal" and "abnormal" (NO in Step S102), the processes of Steps S102 to S106 are executed.

In Step S102, the support device 200 calculates the importance levels of the feature values generated in Step S100 using each of a plurality of methods (Step S104). Then, the support device 200 integrates the importance levels of the feature values calculated using the methods and ranks the feature values (Step S106).

In Step S124, the support device 200 calculates the importance levels of the feature values generated in Step S100 using each of a plurality of methods (Step S124). Then, the support device 200 integrates the importance levels of the feature values calculated using the methods and ranks the feature values (Step S126).

Although the importance levels of the feature values are calculated in both Steps S106 and S126, in Step S126 in which there is no feature value labeled "abnormal," there is a limit on the importance levels that can be calculated. For this reason, the importance level of each of the generated feature values may be calculated using only one method in that situation in Steps S106 and S126.

The plurality of feature values generated in Step S100 are ranked in descending order of importance levels through the above-described processes.

The feature value selection function 274 of the analysis tool 230 is in charge of the above-described processes of Steps S102 to S106, S124, and S126. More specifically, in Steps S104 and S124, the feature value selection function 274 of the analysis tool 230 calculates the importance levels each indicating the effective degree for abnormality detection using the plurality of methods for each of the plurality of generated feature values. Then, in Step S106, the feature value selection function 274 of the analysis tool 230 integrates the plurality of importance levels of the plurality of generated feature values calculated using the plurality of methods and determines rankings of the importance levels for the plurality of generated feature values. Details of this operation will be described below.

Next, the support device 200 executes the processes of Steps S108 to S118 or Steps S128 and S130. These processes are realized by the parameter determination function 276 of the analysis tool 230. The processes of Steps S108 to S118 (excluding Step S110) or the processes of Steps S128 and S130 of FIG. 5 correspond to an abnormality detection application (abnormality score calculation) function by the feature value selection function 274, and the process of Step S110 of FIG. 15 corresponds to a virtual data generation function by the feature value selection function 274.

First, after the execution of Step S106, the support device 200 adds the feature values to calculation targets of an abnormality score in descending order of the rankings (Step S108). That is, feature values with higher importance levels may be preferentially selected.

Here, the support device 200 adds virtual data to the learning data set (Step S110). The process of adding the virtual data to the learning data set in Step S110 will be descried below in detail.

Next, the support device 200 calculates an abnormality score based on the one or more feature values including the feature values added in Step S108 using the learning data set to which the virtual data has been added (Step S112). Then, the support device 200 calculates abnormality detection accuracy based on the calculated abnormality score (Step S114). The support device 200 determines whether the abnormality detection accuracy calculated in Step S114 has been improved further than the previously calculated abnormality detection accuracy (Step S116). When the accuracy is determined to have been improved further than the previously calculated abnormality detection accuracy (YES in Step S116), the feature values added in this process are registered as feature values to be used in abnormality detection (Step S118). On the other hand, when the accuracy is determined not to have been improved further than the previously calculated abnormality detection accuracy (NO in Step S116), the feature values added in this process are not registered as feature values to be used in abnormality detection.

The processes of Steps S110 to S118 are repeated until the number of feature values registered as feature values to be used in abnormality detection reaches a predetermined number.

Meanwhile, after the execution of Step S126, the support device 200 registers a predetermined number of feature values as feature values to be used in abnormality detection in descending order of the rankings (Step S128). Then, the support device 200 calculates an abnormality score based on the predetermined number of feature values registered in Step S128 (Step S130).

Finally, the support device 200 determines a threshold value based on the calculated abnormality score in both operations (Step S140). Thereby, the process ends.

In Steps S108 and S128 described above, the parameter determination function 276 of the analysis tool 230 selects a combination of one or plural feature values among the plurality of generated feature values.

In Step S110, the feature value selection function 274 (virtual data generation function) of the analysis tool 230 generates an extra learning data set constituted by at least part of a data series of the feature values of the selected combination and a data series of statistically generated virtual feature values. Note that, in addition to the generation of the extra learning data set, the feature value selection function 274 (virtual data generation function) of the analysis tool 230 may generate an extra evaluation data set by adding the data series of statistically generated virtual feature values to an evaluation data set.

Here, the "evaluation data set" means a data series to be used in evaluation of an abnormality detection capability of a model generated using a learning data set, detection accuracy, an identification capability, and the like. Thus, it is preferable for the "evaluation data set" to be a labeled data series in advance.

In Steps S112 and S114, the parameter determination function 276 of the analysis tool 230 evaluates detection accuracy of the model corresponding to the feature values of the selected combination using the extra learning data set generated in Step S110. Then, in Steps S116 and S118, the parameter determination function 276 of the analysis tool 230 additionally selects an arbitrary feature value and registers the arbitrary feature value as a model when detection accuracy is improved.

I. Calculation and Ranking of Importance Levels of Feature Values

Next, the processes of FIG. 15 for which the feature value selection function 274 of the analysis tool 230 is responsible (Steps S104, S106, S124, and S126) will be described below.

FIG. 16 is a table for describing the process of evaluating the importance level of a feature value executed by the analysis tool 230 of the support device 200 according to the present embodiment. Referring to FIG. 16, the feature value selection function 274 of the analysis tool 230 calculates the importance levels of the feature values using a plurality of methods. In FIG. 16, cases in which evaluation is performed in each of three methods of kurtosis, logistic regression, and decision tree are illustrated as examples.

Kurtosis stored in an evaluation value column 702 represents a value obtained by evaluating the sharpness of frequency distribution of a data series of the target feature values 700. The greater the kurtosis is, the sharper the peak of the frequency distribution becomes and the wider the skirt of the distribution becomes. It is possible to regard that statistics to be used in abnormality detection as being beneficial, that is, important, as kurtosis becomes greater.

In addition, the standard deviation of the frequency distribution of the data series of the target feature values may be used as an evaluation value. In this case, it is possible to determine that, as the standard deviation becomes greater, the feature values are more likely to change and the abnormality detection capability becomes higher (i.e., more important).

Logistic regression stored in an evaluation value column 704 is to apply an arbitrary logistic function to the data series of the target feature values and to search for a parameter that defines a logistic function that maximizes likelihood. Likelihood corresponding to finally searched parameter is regarded as an importance level. That is, it can be regarded that the importance level becomes higher with respect to a feature value which enables estimation with higher accuracy in an arbitrary logistic function.

Typically, logistic regression enables a search for a parameter and calculation of likelihood for each feature value.

A decision tree stored in an evaluation value column 706 is to apply a classification tree to the data series of the target feature values and to use the classification capability as an importance level. As algorithms of the decision tree, CART, C4.5, ID3, and the like are known, and any of these algorithms can be used.

As described above, as typical examples, the importance levels at least include those importance levels calculated in accordance with algorithms of kurtosis for the data series of the feature values, likelihood obtained from execution of logistic regression on the data series of the feature values, and a decision tree.

As described above, values indicating importance levels of the feature values are calculated using the plurality of methods and the result obtained by integrating the calculation results is stored in an evaluation value column 708. Each of the feature values is ranked based on the evaluation values stored in the evaluation value column 708 (a rank column 710).

In Steps S106 and S126 of FIG. 15, ranking is performed with respect to the feature values based on the evaluation values stored in the evaluation value column 708 of FIG. 16.

Since state values labeled "normal" and "abnormal" are obtained in Step S104 of FIG. 15, each method of the kurtosis, logistic regression, and decision tree shown in FIG. 16 can be applied. On the other hand, since only state values labeled "normal" are present in Step S124 of FIG. 15, it is hard to apply the logistic regression and decision tree shown in FIG. 16, and the methods of kurtosis and standard deviation are applied.

The processes from Step S108 and/or processes from Step S128 shown in FIG. 15 are executed based on the rankings of the feature values determined in the above-described process procedure.

As described above, in the abnormality detection system 1 according to the present embodiment, the importance levels of the feature values are respectively calculated using the plurality of methods, then the feature values obtained in the plurality of methods are integrated, and the feature values are ranked in terms of importance levels.

J. Addition of Virtual Data to Learning Data Set

Next, the process (Step S110) for which the parameter determination function 276 of the analysis tool 230 illustrated in FIG. 15 is responsible will be described in detail.

In a case where the distribution of data included in a learning data set is skewed (or biased), it is difficult to raise accuracy of abnormality detection. In such a case, accuracy of abnormality detection is improved by adding virtual data to the learning data set.

Figure 17:
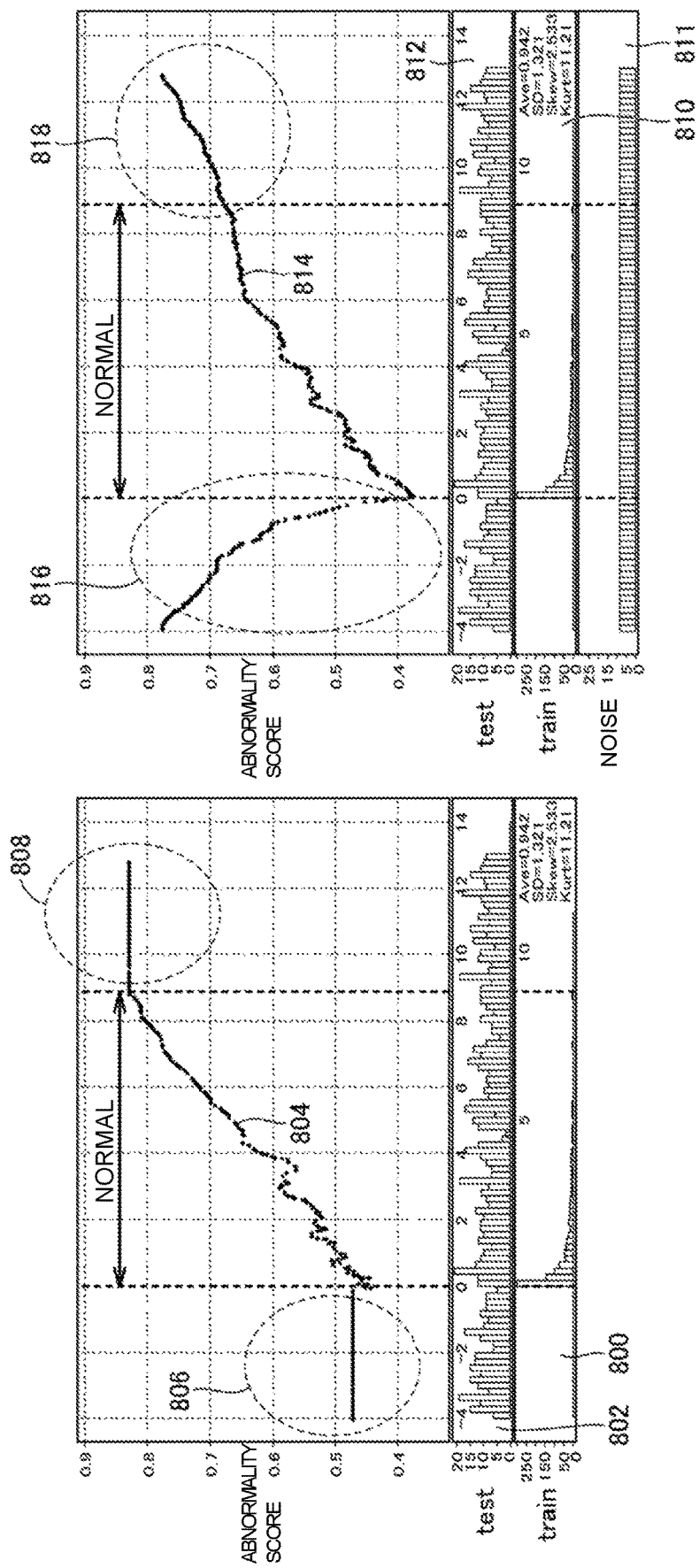
FIGS. 17A and 17B illustrate schematic diagrams for describing a process of adding virtual data to a learning data set by the analysis tool of the support device according to the embodiment.

FIGS. 17A and 17B illustrate schematic diagrams for describing a process of adding virtual data to a learning data set by the analysis tool 230 of the support device 200 according to the present embodiment. FIG. 17A illustrates an example of an original learning data set, and FIG. 17B illustrates an example of the learning data set to which virtual data has been added.

In FIG. 17A, abnormality scores 804 calculated by applying an evaluation data set 802 to a model generated using original learning data 800 are shown.

The evaluation data set 802 may be created by employing a part of a data set of labeled feature values as the learning data 800 and the rest as the evaluation data set 802. That is, a part of a data series of feature values of a combination selected at the time of model generation may be used as the learning data set, and the rest of the data series may be used as the evaluation data set 802.

When the distribution of the learning data 800 is skewed as the fluctuation of the abnormality scores 804 is shown in FIG. 17A, it is difficult to improve accuracy of abnormality detection. In addition, the values of the abnormality scores 804 show no change in abnormality areas 806 and 808 as illustrated in FIG. 17A, and thus no resolution is obtained.

In FIG. 17B, abnormality scores 814 calculated by applying an evaluation data set 812 to a model generated using a learning data set in which noise 811 has been added to original learning data 810 as virtual data are shown.

It can be ascertained according to the abnormality scores 814 shown in FIG. 17B that points indicate higher abnormality scores as they are farther from normality points (i.e., the learning data), and abnormalities can be detected with satisfactory accuracy even when the distribution of data included in the learning data set is skewed (or biased). In addition, it can be ascertained that the values of the abnormality scores 814 show significant fluctuation in abnormality areas 816 and 818 and thus resolution has increased, in comparison to FIG. 17A.

As described above, the abnormality scores 804 correspond to probabilities of an error detection when the evaluation data set 812 is applied to the model obtained using the extra learning data set obtained by adding the virtual data to the original learning data set.

Note that virtual data can likewise be added to the evaluation data set 812. In this case, abnormality scores 804 (probabilities of error detection) are calculated using an extra evaluation data set obtained by adding virtual data to the evaluation data set 812.

Next, an example of a method of generating virtual data to be added to the learning data 810 will be described.

As virtual data, it is preferable to use noise generated from a uniform distribution in a certain range or the like. The procedure of generating such virtual data is as follows.

(1) A distribution range of virtual data to be added is determined (e.g., with respect to a range from a minimum to a maximum of a data set of generated feature values, a range from a lower limit obtained by subtracting an arbitrary offset from the minimum to an upper limit obtained by adding an arbitrary offset to the maximum, or the like can be set).

(2) Pieces of data N of the virtual data to be added are determined (e.g., N=pieces of data included in a learning data set×5%, etc.).

(3) Pieces of data M per dimension (feature value) of the virtual data to be added are determined (i.e., pieces of data N to be added=pieces of data M∧ (the number of dimensions)).

(4) A pitch L of the virtual data to be added is calculated (the width corresponds to the value obtained by dividing the distribution range of the virtual data determined in (1) by the pieces of data M).

(5) Finally, the virtual data per dimension (feature value) is generated (data is generated at the pitch L in the distribution range of the virtual data determined in (1)).

(6) Virtual data including elements of all M dimensions is generated using permutations and combinations of the virtual data of each dimension (N pieces per dimension).

FIG. 18 is a table showing an example of virtual data generated by the analysis tool 230 of the support device 200 according to the present embodiment. In FIG. 18, an example in which two-dimensional virtual data is generated is shown. Each of the dimensions (feature value 1 and feature value 2) has three elements. That is, in a case where feature value 1=[10, 20, 30] and feature value 2=[−20, 0, 20], virtual data generated from combinations thereof is as illustrated in FIG. 18.

The virtual data can be added to both or either of a learning data set and an evaluation data set by adding the virtual data generated as described above to a data set of feature values generated from raw data.

Note that, by adjusting the slider 540 included in the user interface screen 520 illustrated in FIG. 14, the distribution range of the virtual data to be added can be adjusted, and by adjusting the slider 542 included in the user interface screen 520 illustrated in FIG. 14, the number of pieces of virtual data to be added can be appropriately changed.

That is, the sliders 540 and 542 included in the user interface screen 520 of FIG. 14 correspond to the function of receiving a setting of statistical characteristics of a data series of virtual feature values to be added.

The virtual data is generated through the above-described process procedure.

K. Evaluation of Abnormality Detection Accuracy

Next, the processes (Steps S112, S114, and S130) for which the parameter determination function 276 of the analysis tool 230 shown in FIG. 15 is in charged will be described in detail.

In the abnormality detection system 1 according to the present embodiment, abnormality detection is performed using, for example, the iForest method. In the iForest method, a learning data set is divided with partitions set randomly and a tree structure having each partition as a node is built in a model generation stage. In abnormality detection, it is determined whether input data is abnormal based on a depth to a root node (a path length or the number of partitions on a path) of a model created in advance.

When the iForest method is used, the abnormality score calculated in Steps S112 and S130 can be calculated based on a path length acquired by dividing the learning data set by partitions. Furthermore, the method of computing abnormality detection accuracy in Step S114 can be realized by computing the area under the curve (AUC) based on a receiver operating characteristic (ROC) curve defined by a true positive axis and a false positive axis.

That is, a probability of an error detection (determining data labeled "normal" to be "abnormal" or determining data labeled "abnormal" to be "normal") is evaluated using data labeled "normal" and data labeled "abnormal" included in the learning data set.

As described above, abnormality detection accuracy can be calculated each time with each combination of the data series of feature values used as the learning data set.

L. Modified Example

Although the control device 100 and the support device 200 are provided as independent configurations in the abnormality detection system 1 illustrated in FIG. 2, the entire or a part of the functions of the support device 200 may be incorporated into the control device 100. For example, by implementing the analysis tool 230, which is implemented in the support device 200, in the control device 100, transmission of raw data and repetitive execution of the model generation process can be realized more easily.

The above-described module configurations illustrated in FIGS. 6 and 7 are merely examples, and any form of configuration may be employed as long as it can provide the above-described functions. For example, the function modules illustrated in FIGS. 6 and 7 may be implemented as a set of a plurality of function modules, and the plurality of function modules illustrated in FIGS. 6 and 7 may be implemented as a single module due to a restriction on hardware, a restriction on programming, or the like.

M. Appendix

The above-described embodiment includes the following technical ideas.

[Configuration 1]

An abnormality detection system includes:

a control computation part (10, 130) that executes a control computation for controlling a control target;

a first abnormality detection part (12, 150) that detects an abnormality that can occur in a monitoring target by giving a state value (16, 142) related to the monitoring target among state values collected by the control operation part to a model that is defined by an abnormality detection parameter (162) and a learning data set (160), wherein the model indicates the monitoring target;

a state value storage part (14, 140) that stores at least a state value related to the monitoring target among the state values collected by the control computation part;

a second abnormality detection part (30, 280) that executes substantially the same detection process as the first abnormality detection part using the state values provided from the state value storage part; and a model generation part (20, 270) that determines the abnormality detection parameter and the learning data set based on a detection result of the second abnormality detection part, and the model generation part includes:

a section (222, 272) for generating a plurality of feature values from the state values provided from the state value storage part;

a section (24, 274) for selecting a combination of one or a plurality of feature values among the plurality of the generated feature values;

a section (26, 274) for generating an extra learning data set including at least a part of a data series of the feature values of the selected combination and a data series of virtual feature values that are generated by a statistical method; and a section (28, 276) for evaluating a detection accuracy of a model corresponding to the feature values of the selected combination using the extra learning data set.

[Configuration 2]

An abnormality detection system described in Configuration 1, in which the part of the data series of the feature values of the selected combination is used as the learning data set (800) and the rest of the data series is used as an evaluation data set (802), and the section for evaluating the detection accuracy calculates a probability of an error detection when the evaluation data set is applied to the model obtained using the extra learning data set.

[Configuration 3]

The abnormality detection system described in Configuration 2, in which the model generation part further includes a section for generating an extra evaluation data set (812) by adding the data series (811) of the virtual feature values that are generated by the statistical method to the evaluation data set, and the section for evaluating the detection accuracy calculates a probability of an error detection using the extra evaluation data set.

[Configuration 4]

The abnormality detection system described in Configuration 2 or 3, in which the model generation part further includes a section (540, 542) for receiving a setting of a statistical characteristic of the data series of the virtual feature values to be added.

[Configuration 5]

The abnormality detection system described in any one of Configurations 1 to 4, in which the model generation part further includes a section (276) for registering an arbitrary feature value as the model when the detection accuracy is increased due to the arbitrary feature value being additionally selected.

[Configuration 6]

The abnormality detection system described in any one of Configurations 1 to 5, in which the model generation part further includes a section (230) for labeling a specific range of the data series of the plurality of the generated feature values as at least one of "normal" and "abnormal."

[Configuration 7]

The abnormality detection system described in any one of Configurations 1 to 6, in which the model generation part further includes a section (274) for calculating importance levels of each of the generated feature values, and the section for selecting the combination of the feature values preferentially selects a feature value having a high importance level.

[Configuration 8]

The abnormality detection system described in any one of Configurations 1 to 7, further including:

a section (232) for setting the abnormality detection parameter and the learning data set determined by the model generation part in the first abnormality detection part.

[Configuration 9]

A support device (200) that is connected to a control device (100) for controlling a control target, the control device including a first abnormality detection part (12, 150) that detects an abnormality that can occur in a monitoring target by giving a state value (16, 142) related to the monitoring target among collected state values to a model that is defined by an abnormality detection parameter (162) and a learning data set (160), wherein the model indicates the monitoring target and a state value storage part (14, 140) that stores at least a state value related to the monitoring target among the collected state values, the support device including:

a second abnormality detection part (30, 280) that executes substantially the same detection process as the first abnormality detection part using the state values provided from the state value storage part; and a model generation part (20, 270) that determines the abnormality detection parameter and the learning data set based on a detection result of the second abnormality detection part, and in which the model generation part includes:

a section (222, 272) for generating a plurality of feature values from the state values provided from the state value storage part;

a section (24, 274) for selecting a combination of one or a plurality of feature values among the plurality of the generated feature values;

a section (26, 274) for generating an extra learning data set including at least part of a data series of the feature values of the selected combination and a data series of virtual feature values that are generated by a statistical method; and a section (28, 276) for evaluating a detection accuracy of a model corresponding to the feature values of the selected combination using the extra learning data set.

[Configuration 10]

A model generation method of an abnormality detection system (1), the abnormality detection system including: a control computation part (10, 130) that executes a control computation for controlling a control target;

a first abnormality detection part (12, 150) that detects an abnormality that can occur in a monitoring target by giving a state value (16, 142) related to the monitoring target among state values collected by the control operation part to a model that is defined by an abnormality detection parameter (162) and a learning data set (160), wherein the model indicates the monitoring target;

a state value storage part (14, 140) that stores at least a state value related to the monitoring target among the state values collected by the control computation part;

a second abnormality detection part (30, 280) that executes substantially the same detection process as the first abnormality detection part using the state values provided from the state value storage part; and a model generation part (20, 270) that determines the abnormality detection parameter and the learning data set based on a detection result of the second abnormality detection part, and the model generation method including:

a step (S100) of generating a plurality of feature values from the state values provided from the state value storage part;

a step (S108) of selecting a combination of one or a plurality of feature values among the plurality of generated feature values;

a step (S110) of generating an extra learning data set constituted by at least part of a data series of the feature values of the selected combination and a data series of virtual feature values that are generated by a statistical method; and a step (S112, S114) of evaluating a detection accuracy of a model corresponding to the feature values of the selected combination using the extra learning data set.

N. Other Examples

An abnormality detection system according to an example of the disclosure includes a control operation part that executes a control operation for controlling a control target; a first abnormality detection part that detects an abnormality that can occur in a monitoring target by giving a state value related to the monitoring target among state values collected by the control operation part to a model that is defined by an abnormality detection parameter and a learning data set, wherein the model indicates the monitoring target; a state value storage part that stores at least a state value related to the monitoring target among the state values collected by the control computation part; a second abnormality detection part that executes substantially the same detection process as the first abnormality detection part using the state values provided from the state value storage part; and a model generation part that determines the abnormality detection parameter and the learning data set based on a detection result of the second abnormality detection part. The model generation part includes a section for generating a plurality of feature values from the state values provided from the state value storage part; a section for selecting a combination of one or a plurality of feature values among the plurality of generated feature values; a section for generating an extra learning data set including at least a part of a data series of the feature values of the selected combination and a data series of virtual feature values that are generated by a statistical method; and a section for evaluating a detection accuracy of a model corresponding to the feature values of the selected combination using the extra learning data set.

According to the disclosure, since detection accuracy of the model corresponding to the feature values of the selected combination can be evaluated using the extra learning data set to which the data series of the statistically generated virtual feature values has been added, the detection accuracy can be more appropriately evaluated even when the number of state values that are actually collected is small.

In the above-described disclosure, part of the data series of the feature values of the selected combination may be used as the learning data set and the rest of the data series may be used as an evaluation data set, and the section for evaluating the detection accuracy may calculate a probability of an error detection when the evaluation data set is applied to the model obtained using the extra learning data set.

According to the disclosure, the probability of the error detection predicted in an actual operation can be calculated in advance by applying the evaluation data set to the model including the extra learning data set.

In the above-described disclosure, the model generation part may further include a section for generating an extra evaluation data set by adding the data series of the virtual feature values that are generated by the statistical method to the evaluation data set. The section for evaluating detection accuracy may calculate a probability of an error detection using the extra evaluation data set.

According to this disclosure, by adding the data series of the statistically generated virtual feature values to the evaluation data set to use the extra evaluation data set, the detection accuracy can be more appropriately evaluated even when the number of state values that are actually collected is small.

In the above-described disclosure, the model generation part may further include a section for receiving a setting of a statistical characteristic of the data series of the virtual feature values to be added.

According to this disclosure, the data series of the virtual feature values can be added to an appropriate degree while a user is actually checking calculated detection accuracy and the like.

In the above-described disclosure, the model generation part may further include a section for registering an arbitrary feature value as the model when the detection accuracy is increased due to the arbitrary feature value being additionally selected.

According to this disclosure, it is possible to increase the detection accuracy of a final model by registering only feature values that can actually increase the detection accuracy among the plurality of feature values.

In the above-described disclosure, the model generation part may further include a section for labeling a specific range of the data series of the plurality of the generated feature values as at least one of "normal" and "abnormal."

According to this disclosure, an increase in the detection accuracy and the model accuracy can be realized by labeling the feature values "normal" and "abnormal."

In the above-described disclosure, the model generation part may further include a section for calculating importance levels of each of the generated feature values, and the section for selecting the combination of the feature values may preferentially select a feature value having a high importance level.

According to this disclosure, since a feature value that is highly likely to increase the model accuracy can be preferentially evaluated, a model can be efficiently constructed.

In the above-described disclosure, the abnormality detection system may further include a section for setting the abnormality detection parameter and the learning data set determined by the model generation part in the first abnormality detection part.

According to this disclosure, the abnormality detection parameter and the learning data set determined using the second abnormality detection part can be reflected in the first abnormality detection part, and thus collection of state values, and determination or updating of the abnormality detection parameter and the learning data set can be repeatedly executed between the first abnormality detection part and the second abnormality detection part.

According to another example of the disclosure, a support device that is connected to a control device for controlling a control target is provided. The control device includes a first abnormality detection part that detects an abnormality that can occur in a monitoring target by giving a state value related to the monitoring target among collected state values to a model that is defined by an abnormality detection parameter and a learning data set, wherein the model indicates the monitoring target; and a state value storage part that stores at least a state value related to the monitoring target among the collected state values. The support device includes a second abnormality detection part that executes substantially the same detection process as the first abnormality detection part using the state values provided from the state value storage part; and a model generation part that determines the abnormality detection parameter and the learning data set based on a detection result of the second abnormality detection part. The model generation part includes a section for generating a plurality of feature values from the state values provided from the state value storage part; a section for selecting a combination of one or a plurality of feature values among the plurality of generated feature values; a section for generating an extra learning data set including by at least a part of a data series of the feature values of the selected combination and a data series of virtual feature values that are generated by a statistical method; and a section for evaluating a detection accuracy of a model corresponding to the feature values of the selected combination using the extra learning data set.

According to this disclosure, since the detection accuracy of the model corresponding to the feature values of the selected combination can be evaluated using the extra learning data set to which the data series of the statistically generated virtual feature values has been added, the detection accuracy can be more appropriately evaluated even when the number of state values that are actually collected is small.

According to another example of the disclosure, a model generation method of an abnormality detection system is provided. The abnormality detection system includes a control computation part that executes a control computation for controlling a control target; a first abnormality detection part that detects an abnormality that can occur in a monitoring target by giving a state value related to the monitoring target among state values collected by the control operation part to a model that is defined by an abnormality detection parameter and a learning data set, wherein the model indicates the monitoring target; a state value storage part that stores at least a state value related to the monitoring target among the state values collected by the control computation part; a second abnormality detection part that executes substantially the same detection process as the first abnormality detection part using the state values provided from the state value storage part; and a model generation part that determines the abnormality detection parameter and the learning data set based on a detection result of the second abnormality detection part. The model generation method includes a step of generating a plurality of feature values from the state values provided from the state value storage part; a step of selecting a combination of one or a plurality of feature values among the plurality of generated feature values; a step of generating an extra learning data set including at least a part of a data series of the feature values of the selected combination and a data series of virtual feature values that are generated by a statistical method; and a step of evaluating a detection accuracy of a model corresponding to the feature values of the selected combination using the extra learning data set.

According to the present technology, it is possible to generate an abnormality detection model with higher accuracy before an actual operation.

O. Advantages

In generation of a model to be used in an abnormality detection system for detecting an abnormality of any monitoring target (an arbitrary machine or device), the model is created and updated using state values collected when an abnormality occurs in an actual monitoring target. Thus, the number of times of trial and error was large for generating a model and it took much time to improve detection accuracy.

For this problem, in the abnormality detection system according to the present embodiment, the same algorithm for abnormality detection as that of the control device is also prepared in the support device. In this environment, creation and updating of a model can be repeatedly executed between the control device and the support device even when no abnormality occurs in an actual monitoring target.

In addition, in the abnormality detection system according to the present embodiment, detection accuracy is evaluated by using an extra data set that is obtained by adding a data series of virtual feature values to a learning data set and/or an evaluation data set. By adding the data series of virtual feature values as described above, a model with high accuracy can be constructed before an actual operation even if it is not possible to collect state values from an actual monitoring target.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An abnormality detection system, comprising:
a control device; and
a support device, connected to the control device
wherein the control device comprises:
a first processor, configured to execute a control computation for controlling a control target, and
detect an abnormality that occurs in a monitoring target and indicates whether the monitoring target functions normally by giving a state value related to the monitoring target among state values collected by the first processor to a model that is defined by an abnormality detection parameter and a learning data set, wherein the model indicates the monitoring target; and
a database, storing at least a state value related to the monitoring target among the state values collected by the first processor;
wherein the support device comprises:
a second processor, configured to execute the same abnormality detection process as the first processor using the state values provided from the database and to determine the abnormality detection parameter and the learning data set based on a detection result of the second processor,
wherein the abnormality detection parameter and the learning data set determined by the second processor of the support device is further provided to the first processor of the control device to start an operation of abnormality detection,
wherein the second processor is further configured to generate a plurality of feature values from the state values provided from the database;
select a combination of one or a plurality of feature values among the plurality of the generated feature values;
generate an extra learning data set including at least a part of a data series of the feature values of the selected combination and a data series of virtual feature values that are generated by a statistical method; and evaluate a detection accuracy of a model corresponding to the feature values of the selected combination using the extra learning data set.

2. The abnormality detection system according to claim 1, wherein the part of the data series of the feature values of the selected combination is used as the learning data set and the rest of the data series is used as an evaluation data set, and
wherein for evaluating the detection accuracy, the second processor is configured to calculate a probability of an error detection when the evaluation data set is applied to the model obtained using the extra learning data set.

3. The abnormality detection system according to claim 2, wherein the second processor is further configured to generate an extra evaluation data set by adding the data series of the virtual feature values that are generated by the statistical method to the evaluation data set, and
wherein the second processor is further configured to calculate the probability of an error detection using the extra evaluation data set.

4. The abnormality detection system according to claim 3, wherein the second processor is further configured to receive a setting of a statistical characteristic of the data series of the virtual feature values to be added.

5. The abnormality detection system according to claim 2, wherein the second processor is further configured to register an arbitrary feature value as the model when the detection accuracy is increased due to the arbitrary feature value being additionally selected.

6. The abnormality detection system according to claim 2, wherein the second processor is further configured to label a specific range of the data series of the plurality of the generated feature values as at least one of "normal" and "abnormal".

7. The abnormality detection system according to claim 2, wherein the second processor is further configured to calculate importance levels of each of the generated feature values, and
wherein for selecting the combination of the feature values, the second processor is further configured to select a feature value having a highest importance level.

8. The abnormality detection system according to claim 1, wherein the second processor is further configured to register an arbitrary feature value in the model when the detection accuracy is increased due to the arbitrary feature value being additionally selected.

9. The abnormality detection system according to claim 1, wherein the second processor is further configured to label a specific range of the data series of the plurality of the generated feature values as at least one of "normal" and "abnormal".

10. The abnormality detection system according to claim 1,
wherein the second processor is further configured to calculate importance levels of each of the generated feature values, and
wherein for selecting the combination of the feature values, the second processor is further configured to select a feature value having a highest importance level.

11. The abnormality detection system according to claim 1, wherein the second processor is further configured to set the abnormality detection parameter and the learning data set determined by the first processor.

12. A model generation method for generating a model used in an abnormality detection system, comprising: wherein the abnormality detection system including a control device; and a support device, connected to the control device,
wherein the control device comprises a first processor, configured to execute a control computation for controlling a control target, and to
detect an abnormality that occurs in a monitoring target and indicates whether the monitoring target functions normally by giving a state value related to the monitoring target among state values collected by the first processor a model that is defined by an abnormality detection parameter and a learning data set, wherein the model indicates the monitoring target; and
a database that stores at least a state value related to the monitoring target among the state values collected by the first processor;
wherein the support device comprises a second processor configured to execute the same abnormality detection process as the first processor using the state values provided from the database; and
the second processor is further configured to determine the abnormality detection parameter and the learning data set based on a detection result of the second processor, and the detection result is performed by analyzing the state values provided from the database
the abnormality detection parameter and the learning data set determined by the second processor of the support device is further provided to the first processor of the control device to start an operation of abnormality detection,
the model generation method comprising:
generating a plurality of feature values from the state values provided from the database;
selecting a combination of one or a plurality of feature values among the plurality of generated feature values;
generating an extra learning data set including at least a part of a data series of the feature values of the selected combination and a data series of virtual feature values that are generated by a statistical method; and
evaluating a detection accuracy of a model corresponding to the feature values of the selected combination using the extra learning data set.

13. The model generation method according to claim 12, wherein the part of the data series of the feature values of the selected combination is used as the learning data set and the rest of the data series is used as an evaluation data set, and
wherein for evaluating the detection accuracy, the second processor is configured to calculate a probability of an error detection when the evaluation data set is applied to the model obtained using the extra learning data set.

14. The model generation method according to claim 13, wherein the, second processor is configured to generate an extra evaluation data set by adding the data series of the virtual feature values that are generated by the statistical method to the evaluation data set, and
wherein the second processor is further configured to calculate the probability of the error detection using the extra evaluation data set.

15. The model generation method according to claim 13, wherein the second processor is further configured to receive a setting of a statistical characteristic of the data series of the virtual feature values to be added.

* * * * *